United States Patent
Tadano et al.

(10) Patent No.: US 11,747,794 B2
(45) Date of Patent: Sep. 5, 2023

(54) CONVEYANCE TASK CONTROL DEVICE, SYSTEM, METHOD, AND COMPUTER-READABLE MEDIUM

(71) Applicant: NEC Corporation, Tokyo (JP)

(72) Inventors: Kumiko Tadano, Tokyo (JP); Yoshiharu Maeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 125 days.

(21) Appl. No.: 17/293,559

(22) PCT Filed: Nov. 13, 2018

(86) PCT No.: PCT/JP2018/042020
§ 371 (c)(1),
(2) Date: May 13, 2021

(87) PCT Pub. No.: WO2020/100220
PCT Pub. Date: May 22, 2020

(65) Prior Publication Data
US 2022/0004170 A1    Jan. 6, 2022

(51) Int. Cl.
*G05B 19/418*    (2006.01)

(52) U.S. Cl.
CPC ........... *G05B 19/41865* (2013.01); *G05B 2219/31273* (2013.01)

(58) Field of Classification Search
CPC .... G05B 19/41865; G05B 2219/31273; G05B 2219/31271; G05B 19/41895; Y02P 90/60; Y02P 90/02; B65G 61/00; G06Q 10/06
See application file for complete search history.

(56) References Cited

U.S. PATENT DOCUMENTS

| 2014/0018955 A1* | 1/2014 | Asakawa | G05B 19/41865 700/230 |
| 2015/0151913 A1* | 6/2015 | Wong | B65G 1/1373 700/214 |

(Continued)

FOREIGN PATENT DOCUMENTS

| JP | S62-024311 A | 2/1987 | |
| JP | H07117851 B2 * | 12/1995 | G05B 19/18 |

(Continued)

OTHER PUBLICATIONS

International Search Report for PCT Application No. PCT/JP2018/042020, dated Jan. 29, 2019.

*Primary Examiner* — Thomas C Lee
*Assistant Examiner* — Tyler Dean Hedrick
(74) *Attorney, Agent, or Firm* — Sughrue Mion, PLLC

(57) ABSTRACT

Provided is a conveyance-task control device that is able to appropriately control conveyance tasks between workstations. A conveyance-task control device (10) includes a task-priority calculation unit (11) and a conveyance-task determination unit (12). The task-priority calculation unit (11) calculates respective priorities of conveyance tasks on the basis of first parameters respectively indicating a degree of how much amount of products in process a plurality of conveyance subjects are conveying in corresponding ones of areas respectively including conveyance routes between a plurality of workstations. The conveyance-task determination unit (12) determines a conveyance task with a highest one of the respective priorities as a candidate for a conveyance task to be performed next.

11 Claims, 14 Drawing Sheets

(56) References Cited

U.S. PATENT DOCUMENTS

2019/0196452 A1\* 6/2019 Koga ................. G05B 19/4093
2019/0310655 A1\* 10/2019 Voorhies ................. B66F 9/063
2021/0097455 A1 4/2021 Tadano et al.

FOREIGN PATENT DOCUMENTS

| JP | H11-246028 A | 9/1999 |
| JP | 2009-069878 A | 4/2009 |
| JP | 2009-123104 A | 6/2009 |
| JP | 2015-118446 A | 6/2015 |
| WO | 2018/189851 A1 | 10/2018 |

\* cited by examiner

| LINK IDENTIFIER | CONVEYANCE-ORIGIN-WS IDENTIFIER | CONVEYANCE-DESTINATION-WS IDENTIFIER |
|---|---|---|
| x1y1 | $WS_{x1}$ | $WS_{y1}$ |
| x1y2 | $WS_{x1}$ | $WS_{y2}$ |
| x1y3 | $WS_{x1}$ | $WS_{y3}$ |
| x2y1 | $WS_{x2}$ | $WS_{y1}$ |
| x2y2 | $WS_{x2}$ | $WS_{y2}$ |
| x2y3 | $WS_{x2}$ | $WS_{y3}$ |
| y1z1 | $WS_{y1}$ | $WS_{z1}$ |
| y2z1 | $WS_{y2}$ | $WS_{z1}$ |
| x3z1 | $WS_{y3}$ | $WS_{z1}$ |

Fig. 8

| MOVING-COST IDENTIFIER | MOVEMENT-ORIGIN-WS IDENTIFIER | MOVEMENT-DESTINATION-WS IDENTIFIER | MOVING COST | DESCRIPTION |
|---|---|---|---|---|
| $C_{x1x1}$ | $WS_{x1}$ | $WS_{x1}$ | 1 | COST OF MOVEMENT FROM INPUT BUFFER OF $WS_{x1}$ TO OUTPUT BUFFER OF $WS_{x1}$ |
| $C_{x1x2}$ | $WS_{x1}$ | $WS_{x2}$ | 2 | COST OF MOVEMENT FROM INPUT BUFFER OF $WS_{x1}$ TO OUTPUT BUFFER OF $WS_{x2}$ |
| $C_{x1y1}$ | $WS_{x1}$ | $WS_{y1}$ | 4 | COST OF MOVEMENT FROM INPUT BUFFER OF $WS_{x1}$ TO OUTPUT BUFFER OF $WS_{y1}$ |
| $C_{x1y2}$ | $WS_{x1}$ | $WS_{y2}$ | 3 | COST OF MOVEMENT FROM INPUT BUFFER OF $WS_{x1}$ TO OUTPUT BUFFER OF $WS_{y2}$ |
| $C_{x1y3}$ | $WS_{x1}$ | $WS_{y3}$ | 2 | COST OF MOVEMENT FROM INPUT BUFFER OF $WS_{x1}$ TO OUTPUT BUFFER OF $WS_{y3}$ |

Fig. 9

| BUFFER IDENTIFIER | BUFFER USE RATE |
|---|---|
| $I_{x1}$ | 80 |
| $O_{x1}$ | 100 |
| $I_{x2}$ | 80 |
| $O_{x2}$ | 100 |
| $I_{y1}$ | 90 |
| $O_{y1}$ | 100 |
| $I_{y2}$ | 90 |
| $O_{y2}$ | 80 |
| $I_{y3}$ | 90 |
| $O_{y3}$ | 70 |
| $I_{z1}$ | 50 |
| $O_{z1}$ | 10 |

Fig. 11

| LINK IDENTIFIER | CONVEYANCE-BUFFER USE RATE |
|---|---|
| x1y1 | 10 |
| x1y2 | 10 |
| x1y3 | 10 |
| x2y1 | 5 |
| x2y2 | 5 |
| x2y3 | 5 |
| y1z1 | 10 |
| y2z1 | 15 |
| y3z1 | 10 |

Fig. 12

| LINK IDENTIFIER | CALCULATION EQUATION | IMPORTANCE LEVEL |
|---|---|---|
| x1y1 | $\dfrac{O_{x1}-I_{y1}-V_{x1y1}}{C'_{x1x1}} = \dfrac{100-90-10}{1}$ | 0 |
| x1y2 | $\dfrac{O_{x1}-I_{y2}-V_{x1y2}}{C'_{x1x1}} = \dfrac{100-90-10}{1}$ | 0 |
| x1y3 | $\dfrac{O_{x1}-I_{y3}-V_{x1y3}}{C'_{x1x1}} = \dfrac{100-90-10}{1}$ | 0 |
| x2y1 | $\dfrac{O_{x2}-I_{y1}-V_{x2y1}}{C'_{x1x2}} = \dfrac{100-90-5}{2}$ | 2.5 |
| x2y2 | $\dfrac{O_{x2}-I_{y2}-V_{x2y2}}{C'_{x1x2}} = \dfrac{100-90-5}{2}$ | 2.5 |
| x2y3 | $\dfrac{O_{x2}-I_{y3}-V_{x2y3}}{C'_{x1x2}} = \dfrac{100-90-5}{2}$ | 2.5 |
| y1z1 | $\dfrac{O_{y1}-I_{z1}-V_{y1z1}}{C'_{x1y1}} = \dfrac{100-50-10}{4}$ | 10 |
| y2z1 | $\dfrac{O_{y2}-I_{z1}-V_{y2z1}}{C'_{x1y2}} = \dfrac{80-50-15}{3}$ | 5 |
| y3z1 | $\dfrac{O_{y3}-I_{z1}-V_{y3z1}}{C'_{x1y3}} = \dfrac{70-50-10}{2}$ | 5 |

Fig. 13

CONVEYANCE TASK CONTROL DEVICE, SYSTEM, METHOD, AND COMPUTER-READABLE MEDIUM

This application is a National Stage Entry of PCT/JP2018/042020 filed on Nov. 13, 2018, the contents of all of which are incorporated herein by reference, in their entirety.

TECHNICAL FIELD

The present invention relates to a conveyance-task control device, a conveyance-task control system, a conveyance-task control method, and a computer-readable medium. More specifically, the present invention relates to a conveyance-task control device, a conveyance-task control system, a conveyance-task control method, and a computer-readable medium with which control conveyance tasks between workstations are controlled.

BACKGROUND ART

Production tasks in a factory or the like are performed at a plurality of workstations, i.e., sites where predetermined tasks such as production or inspection are performed. Actually, each of the workstations is, for example, a shop including a group of, for example, work cells or machines having a certain function. It is conceivable that each of the production tasks is a set of the predetermined tasks to be performed at each of the plurality of workstations. Thus, conveyance tasks are performed between the plurality of workstations.

In this context, Patent Literature 1 discloses an operation control system for unmanned conveying vehicles for timely conveying items to the workstations. The operation control system disclosed in Patent Literature 1 evaluates respective risks of occurrence of idling at the workstations with respect to pairs of the numbers of pallets in respective import buffers of the workstations and the numbers of pallets in respective export buffers of the workstations. In addition, the operation control system disclosed in Patent Literature 1 issues conveyance instructions to the conveying vehicles on the basis of values of the evaluation.

In addition, Patent Literature 2 discloses a conveyance-task control device that is able to appropriately determine task contents in a case where a processing speed at each of the workstations greatly fluctuates. The conveyance-task control device disclosed in Patent Literature 2 calculates importance levels of conveyance tasks on the basis of an at least one or more of use rates of output buffers of conveyance-origin workstations in conveyance tasks, and use rates of input buffers of conveyance-destination workstations in the conveyance tasks. Further, the conveyance-task control device disclosed in Patent Literature 2 determines a conveyance task with a highest one of the importance levels as a candidate for a conveyance task to be performed next. Still further, the conveyance-task control device disclosed in Patent Literature 2 outputs conveyance-task information including information about a conveyance-origin workstation and a conveyance-destination workstation in the determined conveyance task.

CITATION LIST

Patent Literature

Japanese Unexamined Patent Application Publication No. S62-24311
International Patent Publication No. WO 2018/189851

SUMMARY OF INVENTION

Technical Problem

In the technologies disclosed in Patent Literatures listed above, packages may be conveyed into the import buffers (input buffers of the conveyance-destination workstations) parallel to one another via a plurality of routes. Thus, if other ones of the packages to be conveyed into a certain one of the import buffers are not taken into consideration, priorities of the conveyance tasks may not be properly evaluated. In the technologies disclosed in Patent Literatures listed above, influence in the case where the packages are conveyed in parallel to one another via the plurality of routes is not taken into consideration. Thus, if moving routes of the conveying vehicles are complicated, the priorities of the conveyance tasks may not be properly evaluated. As a result, the conveyance tasks between the plurality of workstations may not be appropriately controlled.

An object of the present disclosure is to solve such problems, specifically, to provide a conveyance-task control device, a conveyance-task control system, a conveyance-task control method, and a non-transitory computer-readable medium storing a program, with which conveyance tasks between workstations can be appropriately controlled.

Solution to Problem

According to the present disclosure, there is provided a conveyance-task control device including:

task-priority calculation means for calculating respective priorities of conveyance tasks on the basis of first parameters respectively indicating a degree of how much amount of products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed; and conveyance-task determination means for determining a conveyance task with a highest one of the respective priorities as a candidate for a conveyance task to be performed next.

Further, according to the present disclosure, there is provided a conveyance-task control system including:

the conveyance-task control device; and
the plurality of workstations.

Still further, according to the present disclosure, there is provided a conveyance-task control method including:

calculating respective priorities of conveyance tasks on the basis of first parameters respectively indicating a degree of how much amount of products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed; and determining a conveyance task with a highest one of the respective priorities as a candidate for a conveyance task to be performed next.

Yet further, according to the present disclosure, there is provided a program for causing a computer to function as:

task-priority calculation means for calculating respective priorities of conveyance tasks on the basis of first parameters respectively indicating a degree of how much amount of products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed; and conveyance-task determination means for determining a conveyance task with a highest one of the respective priorities as a candidate for a conveyance task to be performed next.

Advantageous Effects of Invention

According to the present disclosure, it is possible to provide the conveyance-task control device, the conveyance-task control system, the conveyance-task control method, and the non-transitory computer-readable medium storing the program, with which conveyance tasks between workstations appropriately controlled.

BRIEF DESCRIPTION OF DRAWINGS

FIG. 8 is a table exemplifying a conveyance-destination management table according to the second example embodiment;

FIG. 9 is a table exemplifying a moving-cost management table according to the second example embodiment;

FIG. 11 shows an example of buffer use rates acquired respectively from WSs by a workstation-buffer-use-rate acquisition unit;

FIG. 12 shows an example of conveyance-buffer use rates relating to conveyance tasks corresponding to respective link identifiers acquired by a conveyance-buffer-use-rate acquisition unit;

FIG. 13 shows an example of results of calculation of importance levels by the conveyance-task control device according to the second example embodiment.

DESCRIPTION OF EMBODIMENTS

First Example Embodiment

First, a first example embodiment is described.

Figure 1:
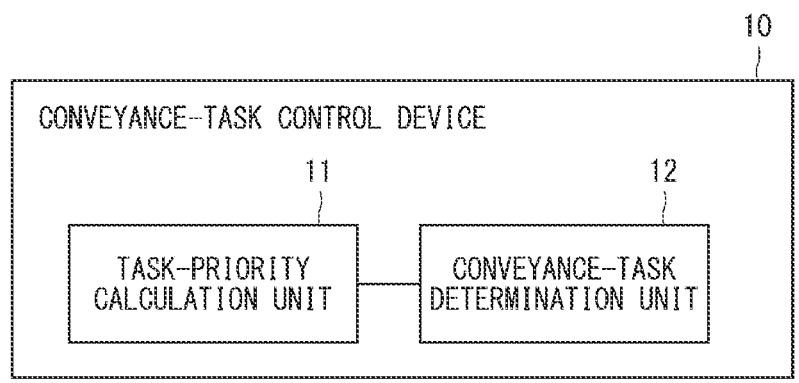
FIG. 1 is a diagram showing a configuration example of a conveyance-task control device according to a first example embodiment.

FIG. 1 is a diagram showing a configuration example of a conveyance-task control device 10 according to the first example embodiment. The conveyance-task control device 10 according to this example embodiment includes a task-priority calculation unit 11 and a conveyance-task determination unit 12.

The task-priority calculation unit 11 functions as task-priority calculation means. The task-priority calculation unit 11 calculates priorities (importance levels) of conveyance tasks on the basis of first parameters indicating a degree of how much amount of products in process a plurality of conveyance subjects are conveying in corresponding ones of areas respectively including conveyance routes between a plurality of workstations. The conveyance-task determination unit 12 functions as conveyance-task determination means. The conveyance-task determination unit 12 determines a conveyance task with a highest one of the priorities as a candidate for a conveyance task to be performed next.

Note that, as described above, the workstations are sites where the predetermined tasks such as production or inspection are performed. Further, the conveyance task refers to a task of conveying the products in process via the conveyance route between the plurality of workstations. Still further, the "conveyance subjects" refer to something that performs the conveyance task, which may be, for example, conveying vehicles that convey packages (the products in process) or workers who convey the products in process. Herein, a system including the plurality of workstations and the plurality of conveyance subjects is assumed. In this system, the task-priority calculation unit 11 calculates the priorities of the conveyance tasks on the basis of the first parameters indicating how many products in process are being conveyed in the corresponding ones of the areas including the conveyance routes. Yet further, the "first parameter (conveyance route parameter)" is, for example, a use rate of a conveyance buffer. Herein, the "conveyance buffer" is a virtual buffer in which products in process to be conveyed by one or more of the conveyance subjects that perform the conveyance task in the area including a route between a conveyance-origin workstation and a conveyance-destination workstation can be present. Note that the "use rate of the conveyance buffer" will be described below. In addition, as described below, the "use rate" of the conveyance buffer is a parameter indicating how much the conveyance buffer is used, which is not limited to a "percentage."

Figure 2:
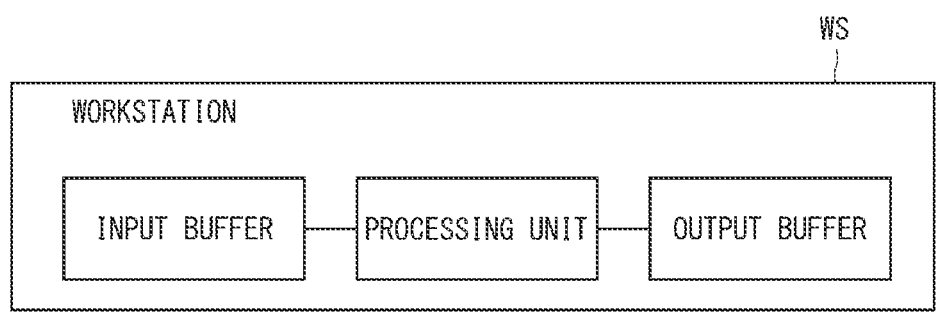
FIG. 2 is a diagram showing a workstation according to the first example embodiment.

FIG. 2 is a diagram showing a workstation WS according to this example embodiment. The workstation WS includes an input buffer, a processing unit, and an output buffer. The processing unit executes the process such as production or inspection. The input buffer and the output buffer store stock of the products in process. Note that, hereinbelow, the workstation may be abbreviated as "WS." In the workstation WS, the products in process conveyed in the input buffer are subjected to the process such as production or inspection in the processing unit, and then stored into the output buffer. Next, the conveyance workers, the conveying vehicles, or the like (the conveyance subjects) take the products in process out of the output buffer of the workstation WS, convey the products in process to an input buffer of another workstation, and store the products in process into the input buffer of the other workstation. In this case, after the processes in the workstation WS, processes in the other workstation WS are executed.

Note that the products in process encompass not only the packages (parts) in production but also finished products. In addition, as described above, the "conveyance buffer" is the virtual buffer in which the products in process to be conveyed by the one or more of the conveyance subjects near the route between the conveyance-origin workstation and the conveyance-destination workstation can be present. In this example embodiment, products in process being conveyed by a group of the conveyance subjects near the route between the workstations are regarded as products in process stored in the conveyance buffer.

Figure 3:
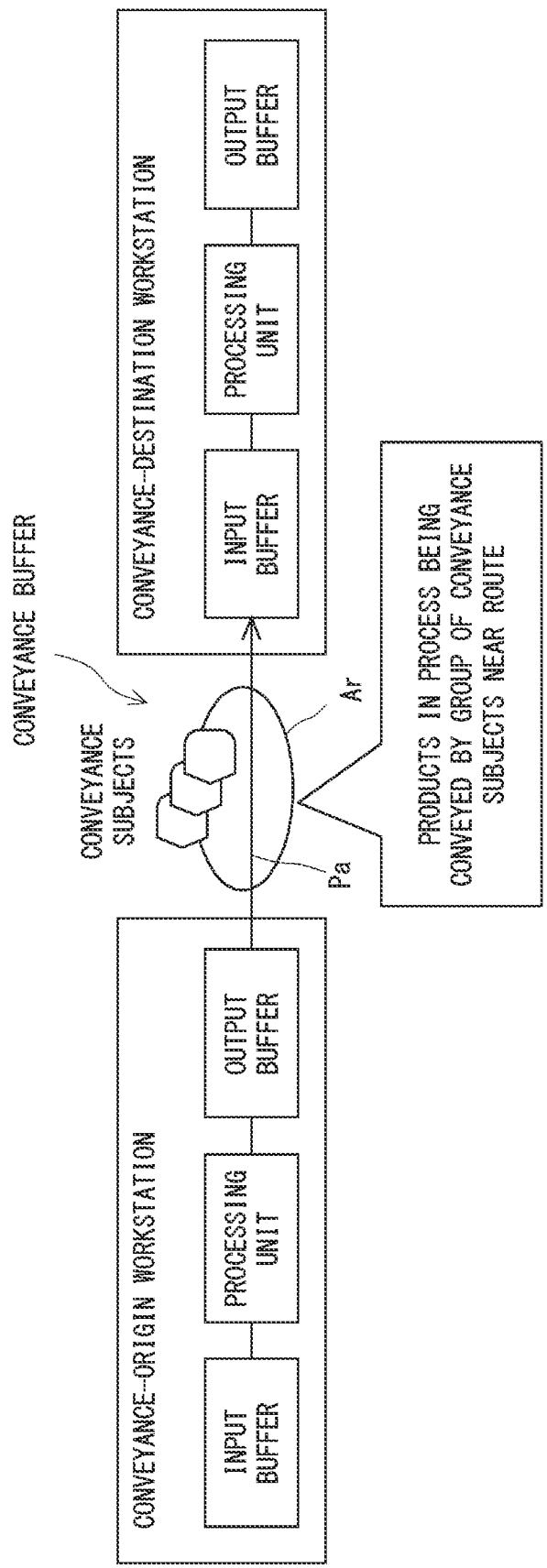
FIG. 3 is an explanatory diagram of a conveyance buffer according to the first example embodiment.

FIG. 3 is an explanatory diagram of the conveyance buffer according to this example embodiment. The conveyance buffer stores products in process that are present in a near area Ar on a route Pa between the output buffer of the conveyance-origin workstation and the input buffer of the conveyance-destination workstation. Note that the near area Ar is an area including the route Pa, which may be an area within a predetermined distance from the route Pa, may be an area of a predetermined size including the route Pa, or may be an area in a predetermined shape including the route Pa. For example, the group of the conveyance subjects conveying the products in process in the near area Ar (three conveyance subjects in the example shown in FIG. 3) may be the conveyance buffer. Alternatively, the near area Ar may be the conveyance buffer. Specifically, in the example shown in FIG. 3, the products in process being conveyed by the conveyance subjects in the near area Ar are stored in the conveyance buffer. Note that, in the example shown in FIG. 3, although the near area Ar including the route Pa has an elliptical shape, the near area Ar may have other shapes. The near area Ar may have a polygonal shape such as a rectangular shape, or may have shapes in consideration of passages and obstacles such as walls in a layout of a factory or a warehouse. For example, the near area Ar may be an area including passages through which the conveyance subjects can travel and excluding the obstacles which obstruct the travel of the conveyance subjects.

Figure 4:
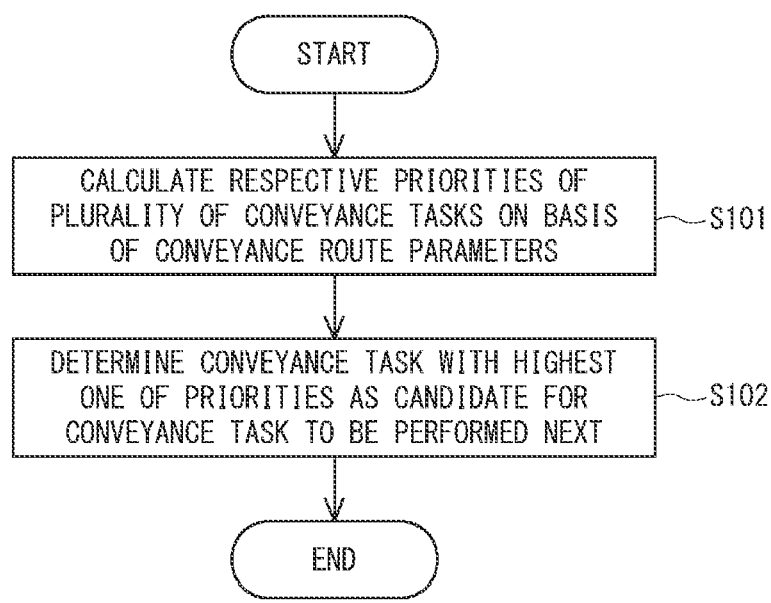
FIG. 4 is a flowchart showing a conveyance-task control method to be implemented by the conveyance-task control device according to the first example embodiment.

FIG. 4 is a flowchart showing a conveyance-task control method to be implemented by the conveyance-task control device 10 according to the first example embodiment. The task-priority calculation unit 11 calculates respective priorities of a plurality of conveyance tasks at least on the basis of the conveyance route parameters (the first parameters) (Step S101). The conveyance-task determination unit 12 determines a conveyance task with a highest one of the priorities as a candidate for a conveyance task to be performed next (Step S102).

In this way, the conveyance-task control device 10 according to the first example embodiment calculates the respective priorities of the plurality of conveyance tasks on the basis of the conveyance route parameters (the first parameters, each of which is, for example, the use rate of the conveyance buffer). By doing so, the conveyance tasks between the workstations can be appropriately controlled.

For example, when the plurality of workstations are linked to one another in a complicated manner, the products in process may be concurrently conveyed into the conveyance-origin input buffer by the plurality of conveyance subjects via a plurality of routes. Meanwhile, also when a large number of products in process are being conveyed in the near area Ar on the route Pa between the workstations, these products in process may be concurrently conveyed into the conveyance-origin input buffer by the plurality of conveyance subjects. In such cases, the plurality of conveyance tasks may be different from one another in conveyance-required time that is required for conveyance. Thus, in calculating a priority (an importance level) of a certain one of the conveyance tasks, this priority may fail to be properly calculated if other ones of the products in process to be conveyed into the conveyance-origin input buffer by other ones of the conveyance tasks are not taken into consideration. Specifically, it is assumed that, in calculating the priority of the certain one of the conveyance tasks, a use rate of the input buffer of the conveyance-destination workstation is low, this conveyance-destination workstation is selected as a conveyance destination, and conveyance is started. In this case, if the other ones of the products in process are conveyed into the input buffer of the conveyance-destination workstation by the other ones of the conveyance tasks, the use rate of this input buffer increases, and the products in process may not be conveyed into this input buffer. As a result, productivity of all the plurality of workstations may be degraded.

In contrast, the conveyance-task control device 10 according to the first example embodiment is configured to calculate the respective priorities of the plurality of conveyance tasks with use of the first parameters indicating a degree of how much amount of products in process are being conveyed in the corresponding ones of the areas respectively including the conveyance routes. By doing so, the priority of the conveyance task can be calculated while taking into consideration the other ones of the products in process being conveyed in the near area Ar including the route Pa between the conveyance-origin workstation and the conveyance-destination workstation. When a large number of products in process are being conveyed in the near area Ar, that is, when the use rate of the conveyance buffer (the first parameter) is high, it is highly likely that a large number of products in process are conveyed into the conveyance-destination workstation. Thus, it is possible to suppress occurrence of a problem that, as described above, the products in process cannot be conveyed into the input buffer by the increase in use rate of the input buffer as a result of the preceding conveyance of the other ones of the products in process by the other ones of the conveyance tasks into the input buffer of the conveyance-destination workstation. In other words, even when the conveyance-required times of the plurality of conveyance tasks in the near areas Ar on the routes Pa between the workstations widely vary from each other (greatly fluctuate), a next conveyance task can be appropriately determined. Thus, the conveyance tasks between the workstations can be appropriately controlled, with the result that the productivity of all the plurality of workstations can be increased. Note that the same applies to a second example embodiment described below.

Second Example Embodiment

Next, the second example embodiment is described. In the second example embodiment, a conveyance-task control device 20 is described in detail.

Figure 5:
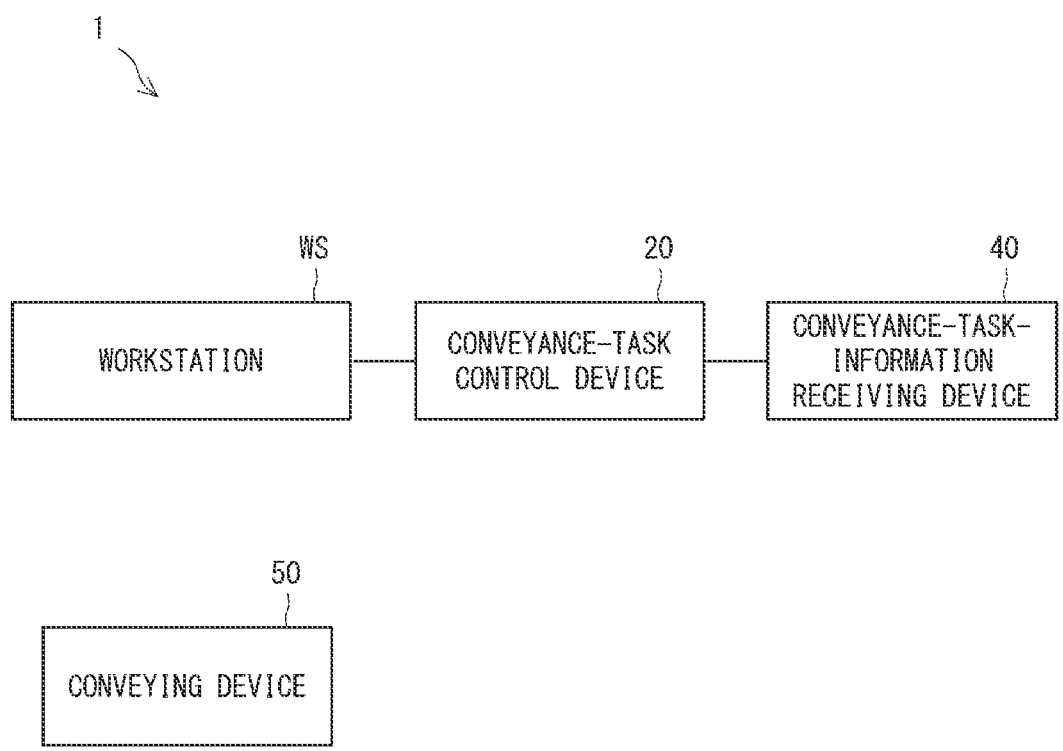
FIG. 5 is a diagram showing a configuration example of a conveyance-task control system according to a second example embodiment.

FIG. 5 is a diagram showing a configuration example of a conveyance-task control system 1 according to the second example embodiment. The conveyance-task control system 1 according to the second example embodiment includes the workstation WS (hereinafter, abbreviated as "WS"), the conveyance-task control device 20, a conveyance-task-information receiving device 40, and a conveying device 50.

The conveyance-task-information receiving device 40 and the conveying device 50 may respectively include one or more conveyance-task-information receiving devices 40 and one or more conveying devices 50 in the conveyance-task control system 1. Meanwhile, the WS may include three or more WSs in the conveyance-task control system 1. In addition, the conveyance-task control device 20 and the conveyance-task-information receiving device 40 may be a single integrated device. As described above, the workstations are the sites where the predetermined tasks such as production or inspection are performed. The conveyance-task control system 1 includes the plurality of workstations and the conveyance subjects that convey the products in process between the workstations. The conveyance subjects perform operation of conveying the products in process via the conveyance route between the workstations.

The conveying device 50 corresponds to the above-described conveyance subject. The conveying device 50 is a device such as the conveying vehicle that performs the task of the conveyance from the conveyance-origin WS to the conveyance-destination WS. The conveyance-task-information receiving device 40 is a device that receives an instruction for a next conveyance task from the conveyance-task control device 20.

For example, when the worker who has got on (in) the conveying vehicle performs the conveyance task, the conveying device 50 is the conveying vehicle, and the conveyance-task-information receiving device 40 is a display device installed in the conveying vehicle or an information terminal held by the worker. Further, when the worker performs the conveyance without using the conveying vehicle, the conveying device 50 corresponds to the worker, and the conveyance-task-information receiving device 40 is the information terminal held by the worker. Still further, when an unmanned-autonomous conveying vehicle performs the conveyance task, the conveying device 50 is the unmanned-autonomous conveying vehicle, and the conveyance-task-information receiving device 40 is a device that receives information about a next conveyance task and issues an instruction for the next conveyance task to the conveying device 50. Specifically, the conveyance-task-information receiving device 40 may be a display device installed inside/outside the conveying device 50 or inside/outside the WS. Note that, in the second example embodiment, it is assumed that the worker holding the conveyance-task-information receiving device 40 gets on the conveying vehicle (the conveying device 50), and performs the conveyance task.

As described above with reference to FIG. 2, the WS is the site where the processes such as production or inspection are executed. Actually, the WS is, for example, a shop including a group of, for example, work cells or machines having a certain function. As shown in FIG. 2, the workstation WS includes the input buffer, the processing unit, and the output buffer.

Figure 6:
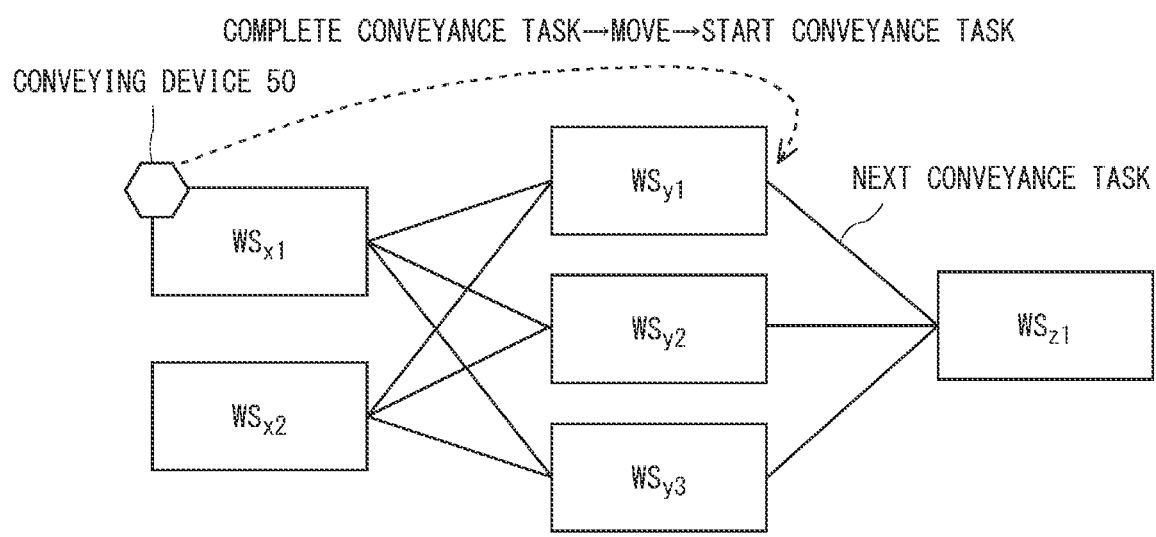
FIG. 6 is a diagram showing a configuration example of an inter-workstation network according to the second example embodiment.

FIG. 6 is a diagram showing a configuration example of an inter-workstation network according to the second example embodiment. In the second example embodiment, a factory in which six WSs ($WS_{x1}$, $WS_{x2}$, $WS_{y1}$, $WS_{y2}$, $WS_{y3}$, and $WS_{z1}$) are present is assumed. In addition, it is assumed that nine links that conceptually represent the conveyance routes (the routes Pa) between the WSs are present. These links specify pairs of the conveyance-origin WSs and the conveyance-destination WSs in the conveyance tasks by the conveying device 50. In other words, these links conceptually represent the conveyance routes between the conveyance-origin WSs and the conveyance-destination WSs. Note that products in process being conveyed via these links are virtually regarded as being stored in ones of the conveyance buffers, the ones corresponding respectively to these links.

Note that, for the sake of simplicity of description, in the second example embodiment, it is assumed that the conveying device 50 performs conveyance from the $WS_{x1}$ and the $WS_{x2}$ to the $WS_{y1}$, the $WS_{y2}$, or the $WS_{y3}$, and conveyance from the $WS_{y1}$, the $WS_{y2}$, and the $WS_{y3}$ to the $WS_{z1}$, and does not perform conveyance in other combinations than these combinations. Further, it is assumed that the conveying device 50 does not perform conveyance from an upstream side relative to the $WS_{x1}$ or the $WS_{x2}$, or conveyance to a downstream side relative to the $WS_{z1}$. Still further, it is assumed that the conveying device 50 that has completed a conveyance task at the $WS_{x1}$ moves to the conveyance-origin WS for a next conveyance task. In addition, in this example embodiment, this next conveyance task is determined. In the example shown in FIG. 6, the conveying device 50 completes the conveyance task at the $WS_{x1}$ moves to the $WS_{y1}$, i.e., the conveyance-origin WS for the next conveyance task, and then performs conveyance to the $WS_{z1}$, i.e., the conveyance-destination WS. In other words, in the example shown in FIG. 6, a conveyance task in which the $WS_{y1}$ is set as the conveyance-origin WS and in which the $WS_{z1}$ is set as the conveyance-destination WS is determined as the next conveyance task. Note that, on the conveyance routes (the links) from the conveyance-origin WSs to the conveyance-destination WSs, the upstream side represents a side where the conveyance-origin WS is present, and the downstream side represents a side where the conveyance-destination WS is present.

Figure 7:
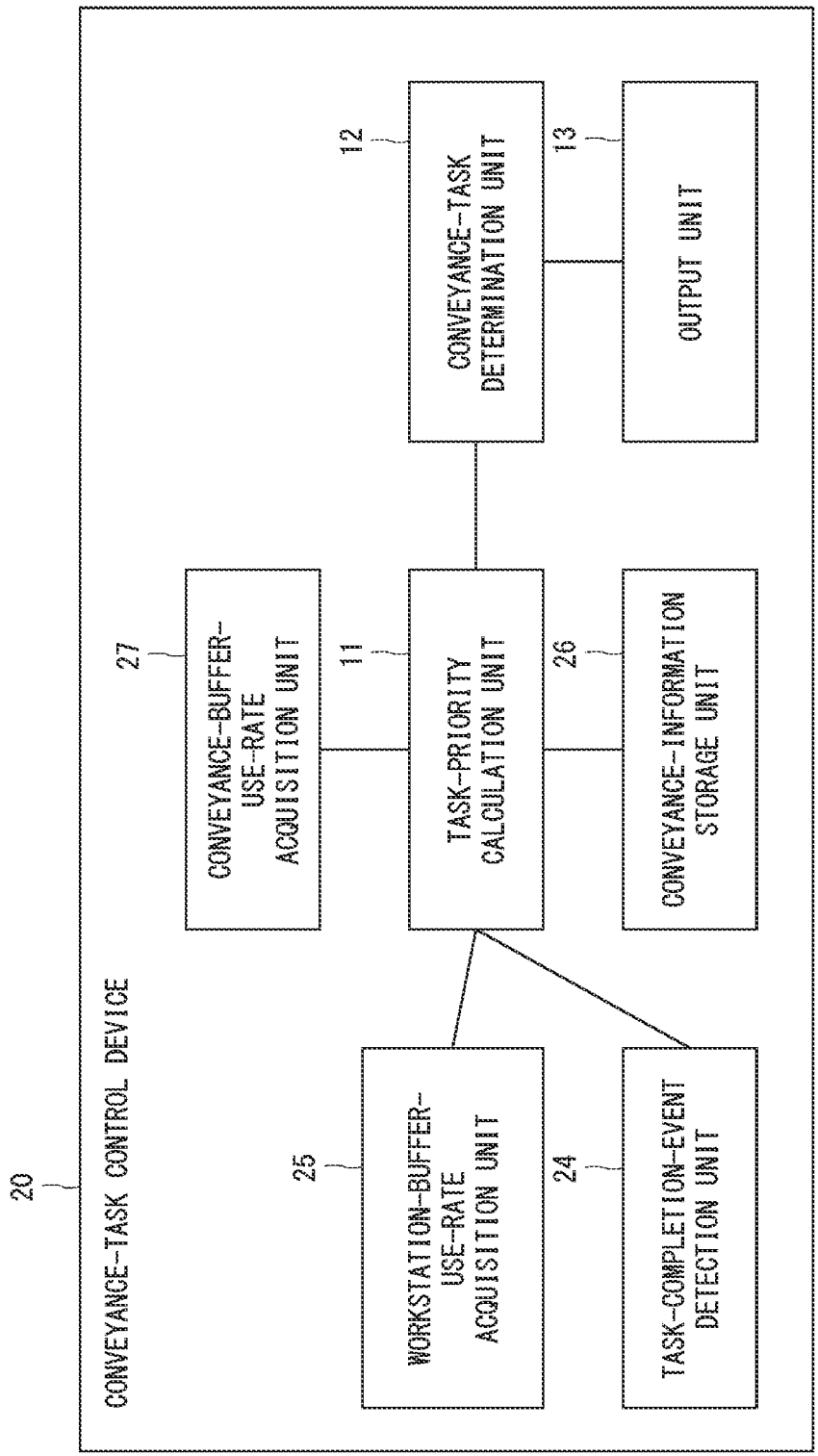
FIG. 7 is a diagram showing a configuration example of a conveyance-task control device according to the second example embodiment.

FIG. 7 is a diagram showing a configuration example of the conveyance-task control device 20 according to the second example embodiment. Similar to the above-described conveyance-task control device 10, the conveyance-task control device 20 according to the second example embodiment includes the task-priority calculation unit 11 and the conveyance-task determination unit 12. In addition, the conveyance-task control device 20 according to the second example embodiment further includes an output unit 13, a task-completion-event detection unit 24, a workstation-buffer-use-rate acquisition unit 25, a conveyance-information storage unit 26, and a conveyance-buffer-use-rate acquisition unit 27.

The task-completion-event detection unit 24 detects completion of the conveyance tasks to be performed by the conveying device 50. The task-completion-event detection unit 24 automatically detects the completion of the conveyance tasks, for example, with use of a passage sensor using infrared rays, ultrasonic waves, or the like, with use of a laser rangefinder, by image recognition using a camera, or by RFID (radio frequency identification) using RF (radio frequency) tags attached, for example, to the products in process. Alternatively, the task-completion-event detection unit 24 may detect the completion of the conveyance tasks in response to manual input such as button press to the conveyance-task-information receiving device 40 by the worker.

In addition, the completion to be detected by the task-completion-event detection unit 24 may be completion of conveyance tasks by all the conveying devices 50 (such as the conveyance workers and the conveying vehicles), or may be completion of conveyance tasks by some of the conveying devices 50. In other words, the task-completion-event detection unit 24 need not necessarily detect the completion of the conveyance tasks by all the conveying devices 50. For example, the completion to be detected by the task-completion-event detection unit 24 may only be completion of a conveyance task by one of the conveying devices 50, the one being present in a certain area, or may be completion of a conveyance task by another of the conveying devices, the other one conveying a certain one of the products in process (such as an express item).

The workstation-buffer-use-rate acquisition unit 25 acquires respective use rates of the input buffers (third parameters) and respective use rates of the output buffers (second parameters) of the WSs. Note that each of the use rates of the buffers may be, for example, a percentage of a use amount stored in a corresponding one of the buffers relative to a buffer capacity indicating a capacity by which the products in process can be stored in the corresponding one of the buffers. Alternatively, each of the use rates of the buffers may be, for example, a difference between the buffer capacity and the use amount, a percentage of the use amount relative to a predetermined reference value, or a percentage of the number (a volume or weight) of the products in process relative to the buffer capacity. In another alternative, each of the use rates of the buffers may be, for example, an absolute value of the use amount of a corresponding one of the buffers (such as the total number of the products in process in the corresponding one of the buffers). Each of the use rates of the buffers can be regarded also as information about status of how much products in process are stored in a corresponding one of the buffers (storage status), or as information about status in which the corresponding one of the buffers is used (use status). In other words, each of the use rates of the buffers is a parameter indicating how much a corresponding one of the buffers is used. In still other words, each of the second parameters is, for example, a parameter indicating how much a corresponding one of the conveyance-origin buffers is used. Meanwhile, each of the third parameters is, for example, a parameter indicating how much a corresponding one of the conveyance-destination buffers is used.

In another alternative, the workstation-buffer-use-rate acquisition unit 25 may acquire the use rates of the buffers of all the WSs, or only a use rate of a certain one of the buffers. Specifically, the workstation-buffer-use-rate acquisition unit 25 may acquire a use rate of, for example, a buffer of a WS processing a specific one of the products in process, a buffer of a WS in which the buffers have small sizes, or use rates of buffers of WSs that vary from each other in processing capability.

In addition, the workstation-buffer-use-rate acquisition unit 25 may automatically detect the use rates of the buffers with use of, for example, the RFID (radio frequency identification) using the RF (radio frequency) tags attached to the products in process, the image recognition using a camera, or a weighing scale. Alternatively, the workstation-buffer-use-rate acquisition unit 25 may detect the use amount of the buffers in response to the manual input by the worker. As examples of a method of the manual input, it is conceivable that the worker reads a specific barcode with use of a mobile terminal (such as the conveyance-task-information receiving device 40) each time a product in process is conveyed into or taken out of a buffer, and transmits information about the barcode from the mobile terminal to the workstation-buffer-use-rate acquisition unit 25.

The conveyance-buffer-use-rate acquisition unit 27 acquires the respective use rates of the conveyance buffers between the conveyance-origin WSs and the conveyance-destination WSs (the first parameters, i.e., the conveyance route parameters). Each of the use rates of the conveyance buffers on the conveyance routes is information about status of a degree of how much amount of products in process are being conveyed via a corresponding one of the conveyance routes, or information corresponding to a conveyance margin of the corresponding one of the conveyance routes. In other words, in the conveyance-task control system 1, the conveyance-buffer-use-rate acquisition unit 27 detects a degree of how much amount of products in process the conveyance subjects are conveying via the conveyance routes between the workstations (the first parameters). The conveyance-buffer-use-rate acquisition unit 27 may calculate the conveyance margin indicating a difference between the detected degree and the degree in which products in process can be conveyed via the corresponding one of the conveyance routes. Each of the use rates of the conveyance buffers may be, for example, an absolute value of the use amount of a corresponding one of the conveyance buffers. In this case, each of the use rates of the conveyance buffers (the absolute values of the use amounts) may be the total number of cargoes of the products in process being conveyed by the group of, for example, the conveyance workers or the conveying vehicles, the group being present in the near area Ar on the route Pa between the output buffer of the conveyance-origin WS and the input buffer of the conveyance-destination WS. Alternatively, each of the use rates of the conveyance buffers may be, for example, a percentage of the use amount relative to a conveyance buffer capacity (such as a maximum value of the total number of the products in process to be conveyed via a corresponding one of the routes, which is calculated, for example, from a physical shape such as a width or a length of the corresponding one of the routes, from shapes or sizes of the conveying vehicles, or from the amount of products in process that can be carried at once). In another alternative, each of the use rates of the conveyance buffers may be, for example, a difference between the conveyance buffer capacity and a corresponding one of the use amounts, may be a percentage of the corresponding one of the use amounts relative to a predetermined reference value, or may be a percentage of the amount of the products in process relative to the conveyance buffer capacity.

Each of the use rates of the conveyance buffers on the conveyance routes (the routes Pa) may be calculated by applying a weight to the use amount of the products in process in accordance with geometrical information such as a center of gravity of the near area Ar near a position of a corresponding one of the conveyance routes, and a distance, for example, from a center line of the corresponding one of the conveyance routes. Alternatively, each of the use rates of the conveyance buffers on the conveyance routes may be calculated by dividing the single near area near a position of a corresponding one of the conveyance routes into a plurality of areas, and by applying a weight to each of the divided areas. For example, on a conveyance route from the conveyance-origin WS to the conveyance-destination WS, the weight may be reduced because conveyance is highly likely to be finished soon in an area away from the conveyance-origin workstation, and the weight may be increased because conveyance is highly likely to be finished late in an area near the conveyance-origin workstation. In this case, the weight can be regarded also as information about a time required for completing the process of conveying the products in process via the conveyance route. In other words, in this case, the required time becomes longer as a value of the weight becomes larger, and the required time becomes shorter as the value of the weight becomes smaller. By applying the weights to the use amounts of the products in process in acquiring the use rates of the conveyance buffers in such ways, the conveyance tasks between the workstations can be more appropriately controlled. As a result, the productivity of all the plurality of workstations can be further increased. In addition, as described above, the near area corresponding to a certain one of the conveyance buffers may have the polygonal shape such as the rectangular shape, or may have the shapes in consideration of the passages and obstacles such as walls in a layout of a factory or a warehouse.

In addition, the conveyance-buffer-use-rate acquisition unit 27 may acquire the use rates of the conveyance buffers on the conveyance routes between all the conveyance-origin WSs and all the conveyance-destination WSs, or only use rates of some of the conveyance buffers. In other words, the conveyance-buffer-use-rate acquisition unit 27 need not necessarily acquire the use rates of the conveyance buffers on all the conveyance routes. For example, the conveyance-buffer-use-rate acquisition unit 27 may acquire a use rate of a conveyance buffer on a route where a specific one of the products in process is being conveyed. Alternatively, the conveyance-buffer-use-rate acquisition unit 27 may acquire a use rate of a conveyance buffer on a route where a specific one of the conveying devices 50 is performing conveyance. In another alternative, the conveyance-buffer-use-rate acquisition unit 27 may acquire a use rate of a conveyance buffer on a route where a size of the buffer that is able to store the products in process is small. In still another alternative, the conveyance-buffer-use-rate acquisition unit 27 may acquire a use rate of a conveyance buffer on a route where traffic of the conveying devices 50 (the conveyance subjects) is heavy. In yet another alternative, the conveyance-buffer-use-rate acquisition unit 27 may acquire a use rate of a conveyance buffer on a route where the products in process are conveyed frequently or a large amount of products in process are conveyed. In yet another alternative, the conveyance-buffer-use-rate acquisition unit 27 may acquire a use rate of a conveyance buffer on a route where the conveyance-required time widely varies for reasons such as a liability to cause congestion and the like due to the route shape or the like. By acquiring the use rates of certain ones of the conveyance buffers in such ways, the conveyance tasks between the workstations can be more appropriately controlled. As a result, the productivity of all the plurality of workstations can be further increased.

In addition, the conveyance-buffer-use-rate acquisition unit 27 may automatically detect the use rates of the buffers with use of, for example, the RFID using the RF tags attached to the products in process, the image recognition using a camera, or a weighing scale. Alternatively, the conveyance-buffer-use-rate acquisition unit 27 may detect the use amounts of the buffers in response to the manual input by the worker. As examples of the method of the manual input, it is conceivable that the worker reads a specific barcode with use of the mobile terminal each time a product in process is taken out of an output buffer and conveyed into an input buffer, and transmits information about the barcode from the mobile terminal to the conveyance-buffer-use-rate acquisition unit 27.

Further, as other methods of the automatic detection, the following methods may be adopted. For example, a database server or the like (not shown) is prepared to manage conveyance status such as a conveyance-start time point and a conveyance-finish time point. Then, if a product in process has started to be conveyed via a certain one of links (routes), and notification of completion of the conveyance has not yet been output even thereafter, it may be determined that this product in process is stored in a conveyance buffer on the link. Alternatively, for example, the database server or the like may be prepared to record movement tracks of products in process being conveyed so as to determine that, if a product in process having departed from a conveyance origin on a certain one of the links has not yet arrived at a conveyance destination, this product in process is stored in a conveyance buffer on the link.

The conveyance-information storage unit 26 stores information about the conveyance tasks. In the second example embodiment, it is assumed that the conveyance-information storage unit 26 stores a conveyance-destination management table (i.e., conveyance-destination management tag, conveyance-destination management data) and a moving-cost management table (i.e., moving-cost management tag, moving-cost management data). Herein, the conveyance-destination management table is information about conveyance tasks (links) to be candidates for from which of the WSs (the conveyance origins) to which of the WSs (the conveyance destinations) conveyance is performed. Meanwhile, the moving-cost management table is information about moving costs that are required when the conveying device 50 moves between the WSs. In addition, examples of the moving costs include information about at least any of times that are required for moving the conveying device 50 (the conveyance subject), moving distances, and costs that are required for the movement (such as a fuel cost).

FIG. 8 is a table exemplifying the conveyance-destination management table according to the second example embodiment. As shown in FIG. 8, as the conveyance-destination management table, the conveyance-information storage unit 26 stores respective pairs of conveyance-origin-WS identifiers and conveyance-destination-WS identifiers for each of the identifiers of the links on the inter-WS network where the WSs are linked to each other. For example, a link identifier "x1y1" represents a link (a conveyance route) between a WS represented by a conveyance-origin-WS identifier "$WS_{x1}$" and a WS represented by a conveyance-destination-WS identifier "$WS_{y1}$."

FIG. 9 is a table exemplifying the moving-cost management table according to the second example embodiment. As shown in FIG. 9, as the moving-cost management table, the conveyance-information storage unit 26 stores, for example, respective sets of movement-origin-WS identifiers, movement-destination-WS identifiers, and the moving costs (such as required distances and the required times), and supplementary description, for each moving-cost identifiers. In the example shown in FIG. 9, it is assumed that the conveying device 50 moves from a WS represented by a movement-origin-WS identifier "$WS_{x1}$" so as to perform a next conveyance task. For example, a moving-cost identifier "$C_{x1x1}$" represents a moving cost at a time of a movement from the WS represented by the movement-origin-WS identifier "$WS_{x1}$" to the WS represented by a movement-destination-WS identifier "$WS_{x1}$." In this case, the conveying device 50 can move within a single WS. Meanwhile, a moving-cost identifier "$C_{x1x2}$" represents a moving cost at a time of a movement from the WS represented by the movement-origin-WS identifier "$WS_{x1}$" to a WS represented by a movement-destination-WS identifier "$WS_{x2}$." In this case, the WS represented by the movement-destination-WS identifier "$WS_{x2}$" is a conveyance-origin WS in the next conveyance task. Note that each of the moving costs indicates a cost at a time when the conveying device 50 moves from an input buffer of the WS represented by the movement-origin-WS identifier (a point where a preceding conveyance task is finished) to an output buffer of the WS represented by the movement-destination-WS identifier (a point where products in process are taken out in the next conveyance task).

Each of the moving costs is information (a parameter) indicating a value to be calculated on the basis of one or more of criteria (i.e., rule) such as the moving distance of the conveying device 50, the time that is required for the movement, a type of the device (such as a cart) that is required for the conveyance task, passing through a place where the conveying device 50 interferes with another conveyance task, and ease of passage on a route at a time when the conveying device 50 moves. As for the ease of the passage on the route, criteria such as whether to pass a narrow place, whether a slope, a step, or the like is present on the route, and whether the number of elevators that need to be used is limited are conceivable. Further, when the plurality of criteria are used for calculating the moving costs, a sum of values obtained by applying weights to respective results of the calculations on the basis of the criteria may be used as each of the moving costs.

Still further, the conveyance-information storage unit 26 may store the conveyance-destination management table and the moving-cost management table which are automatically generated on the basis of, for example, a layout view of a factory or a warehouse by the conveyance-task control device 20 or by other devices. Alternatively, the conveyance-information storage unit 26 may store the conveyance-destination management table and the moving-cost management table which are input, for example, by the worker or a layout designer, or may store the conveyance-destination management table and the moving-cost management table which are generated by a combination of the manual input and the automatic generation.

The task-priority calculation unit 11 calculates the importance level of each of the conveyance tasks on the basis of one or more of the use rate of the output buffer of the conveyance-origin WS in a corresponding one of the conveyance tasks and the use rate of the input buffer of the conveyance-destination WS in the corresponding one of the conveyance tasks, and on the basis of the use rate of the conveyance buffer between the conveyance-origin WS and the conveyance-destination WS. Note that the importance level is a parameter indicating the priority of the corresponding one of the conveyance tasks. In other words, the importance level indicates that the corresponding one of the conveyance tasks is finished more preferentially (finished earlier) as the priority of the corresponding one of the conveyance tasks becomes higher, and that the corresponding one of the conveyance tasks is finished less preferentially (finished later) as the importance level of the corresponding one of the conveyance tasks becomes lower. The task-priority calculation unit 11 according to the second example embodiment calculates each of the importance levels (the priorities) not only on the basis of the use rate of the output buffer of the conveyance-origin WS and the use rate of the input buffer of the conveyance-destination WS but also on the basis of the moving cost that is required for the conveying device 50 to move from a current location to the conveyance-origin WS. Note that, for example, when a distance between the WSs is short, the moving cost need not necessarily be used for the calculation of a corresponding one of the importance levels. Alternatively, the task-priority calculation unit 11 according to the second example embodiment calculates each of the importance levels not only on the basis of the use rate of the output buffer of the conveyance-origin WS, the use rate of the input buffer of the conveyance-destination WS, and the moving cost, but also on the basis of the use rate of the conveyance buffer between the conveyance-origin WS and the conveyance-destination WS.

In the second example embodiment, when the task-completion-event detection unit 24 detects the completion of the conveyance tasks, the task-priority calculation unit 11 calculates the respective importance levels of the conveyance tasks on the links to be targets of the calculation of the importance levels. Note that the use rate of the output buffer of the conveyance-origin WS, the use rate of the input buffer of the conveyance-destination WS, and the use rate of the conveyance buffer between the conveyance-origin WS and the conveyance-destination WS are collectively referred to as "use rates of buffers including products in process being conveyed." In this case, the task-priority calculation unit 11 calculates the importance level of each of the conveyance tasks on the basis of, for example, a spatial bias of the use rates of the buffers including products in process being conveyed, differences and ratios between the moving costs, or other evaluation functions. Note that the "spatial bias of the use rates of the buffers including products in process being conveyed" will be described below.

When the importance level is based on the use rate of the output buffer of the conveyance-origin WS (the second parameter, i.e., a conveyance-origin parameter), the importance level becomes higher as the use rate of the output buffer of the conveyance-origin WS becomes higher. This represents a state in which, although processes on many of products in process have already been completed in the conveyance-origin WS, these products in process have not yet been conveyed from the conveyance-origin WS. In other words, this represents a state in which, although the processes on the many of the products in process have already been completed in the conveyance-origin WS, the products in process remain in the conveyance-origin WS. Thus, in such a situation, a conveyance task of conveying the products in process from the conveyance-origin WS is preferentially finished (finished earlier).

When the importance level is based on the use rate of the input buffer of the conveyance-destination WS (the third parameter, i.e., a conveyance-destination parameter), the importance level becomes higher as the use rate of the input buffer of the conveyance-destination WS becomes lower. This represents a state in which, although many of products in process are acceptable in the conveyance-destination WS, these products in process have not yet been conveyed to the conveyance-destination WS. In other words, this represents a state in which, although the conveyance-destination WS has a margin for processing the products in process, the products in process have not yet been conveyed to the conveyance-destination WS. Thus, in such a situation, a conveyance task of conveying the products in process into the conveyance-destination WS is preferentially finished (finished earlier).

When the importance level is based on the use rate of the conveyance buffer between the conveyance-origin WS and the conveyance-destination WS (the first parameter), the importance level becomes higher as the use rate of the conveyance buffer becomes lower. This represents that, as the margin for conveying products in process via a conveyance route becomes higher, a conveyance task via this conveyance route is finished more preferentially. In other words, in this case, the importance level can be regarded also as corresponding to the conveyance margin, which indicates the difference between a degree of how much products in process are being conveyed via the conveyance route by the conveyance subjects and a degree of how much products in process can be conveyed via the conveyance route.

In addition, when the importance level is based on the moving cost, the importance level becomes higher as the moving cost becomes lower. This represents that the conveyance task in which the conveying device 50 is used is finished more preferentially as the cost of moving the conveying device 50 to the conveyance destination becomes lower.

The spatial bias of the use rates of the buffers including products in process being conveyed may be evaluated on the basis of, for example, differences and a ratio between the use rate of the output buffer of the conveyance-origin WS, the use rate of the input buffer of the conveyance-destination WS, and the use rate of the conveyance buffer between the conveyance-origin WS and the conveyance-destination WS, or on the basis of other evaluation functions. The spatial bias of the use rates of the buffers including products in process being conveyed becomes more conspicuous as the use rate of the output buffer of the conveyance-origin WS becomes higher. Further, the spatial bias of the use rates of the buffers including products in process being conveyed becomes more conspicuous as the use rate of the input buffer of the conveyance-destination WS becomes lower. Still further, the spatial bias of the use rates of the buffers including products in process being conveyed becomes more conspicuous as the use rate of the conveyance buffer between the conveyance-origin WS and the conveyance-destination WS becomes lower. In addition, the spatial bias of the use rates of the buffers including products in process being conveyed may be a value in consideration of a spatial bias of immediately-preceding buffers on the upstream side or of immediately-next buffers on the downstream side.

In this context, the use rate of the output buffer of the conveyance-origin WS is defined as an "output-buffer use rate" (the conveyance-origin parameter), and the use rate of the input buffer of the conveyance-destination WS is defined as an "input-buffer use rate" (the conveyance-destination parameter). In addition, the use rate of the conveyance buffer between the conveyance-origin WS and the conveyance-destination WS is defined as a "conveyance-buffer use rate" (a conveyance-route parameter). When the input-buffer use rate and the conveyance-buffer use rate are not used in calculating the importance level, the spatial bias of the use rates of the buffers including products in process being conveyed may be the output-buffer use rate or a value based on this output-buffer use rate. Alternatively, when the output-buffer use rate and the conveyance-buffer use rate are not used in calculating the importance level, the spatial bias of the use rates of the buffers including products in process being conveyed may be the input-buffer use rate or a value based on this input-buffer use rate. In another alternative, when the input-buffer use rate and the output-buffer use rate are not used in calculating the importance level, the spatial bias of the use rates of the buffers including products in process being conveyed may be the conveyance-buffer use rate or a value based on this conveyance-buffer use rate. In still another alternative, when the input-buffer use rate is not used in calculating the importance level, the spatial bias of the use rates of the buffers including products in process being conveyed may be the output-buffer use rate and the conveyance-buffer use rate, or values based on these output-buffer use rate and conveyance-buffer use rate. In yet another alternative, when the output-buffer use rate is not used in calculating the importance level, the spatial bias of the use rates of the buffers including products in process being conveyed may be the use rate of the input buffer and the conveyance-buffer use rate, or values based on these use rate of the input buffer and conveyance-buffer use rate. In yet another alternative, when the conveyance-buffer use rate is not used in calculating the importance level, the spatial bias of the use rates of the buffers including products in process being conveyed may be the input-buffer use rate and the output-buffer use rate, or values based on these input-buffer use rate and output-buffer use rate.

Equation 1 shows an exemplary equation that expresses an importance level IM (the priority) to be calculated by the task-priority calculation unit 11.

[Math 1]

$$IM = \frac{O_y - I_z - V_{yz}}{C_{xy}} \quad \text{(Equation 1)}$$

In Equation 1, "$O_y$" is the output-buffer use rate of a $WS_y$, i.e., the conveyance-origin WS (the conveyance-origin parameter). Further, "$I_z$" is the input-buffer use rate of a $WS_z$, i.e., the conveyance-destination WS (the conveyance-destination parameter). Still further, "$V_{yz}$" is the conveyance-buffer use rate between the conveyance-origin $WS_y$ and the conveyance-destination $WS_z$ (the conveyance-route parameter). Yet further, "$C_{xy}$" is the cost of a movement from the output buffer (a place where a preceding conveyance task has been completed) of a WS, i.e., a movement-origin WS for the conveying device 50 to the input buffer (a place where a next conveyance task is started) of the $WS_y$, i.e., a movement-destination WS (the conveyance-origin WS in the next conveyance task). In Equation 1, the importance level IM is calculated as a difference between the buffer use rates (a difference between the output-buffer use rate and a sum of the input-buffer use rate and the conveyance-buffer use rate) per moving cost. However, the importance level (the priority) is not limited to that expressed by Equation 1.

For example, the importance level may be determined such that, as a value of a difference between a degree of how much amount of products in process remain in an export origin (the conveyance-origin parameter) and a degree of how much amount of the products in process are being conveyed via a conveyance route from this conveyance origin (the conveyance-route parameter) becomes larger, a conveyance process via this conveyance route is finished earlier. Alternatively, the importance level may be determined such that, as a value of a sum of a processing margin of an export destination and a conveyance margin of a conveyance route to this conveyance destination becomes larger, a conveyance process via this conveyance route is finished earlier. In other words, the importance level may be determined such that, as a value of a sum of a degree of how much amount of products in process remain in the export destination (the conveyance-destination parameter) and a degree of how much amount of the products in process are being conveyed via a conveyance route to this conveyance destination (the conveyance-route parameter) becomes smaller, a conveyance process via this conveyance route is finished earlier.

In this context, Equation 2 shows another exemplary equation that expresses the importance level IM to be calculated by the task-priority calculation unit 11.

[Math 2]

$$IM = (O_y - I_z - V_{yz}) - \alpha C_{xy} \quad \text{(Equation 2)}$$

In this equation, "$\alpha$" is a predetermined weighting coefficient ($\alpha > 0$).

Note that the task-priority calculation unit 11 may calculate the importance level at a timing after a predetermined time has elapsed since occurrence of an event of conveyance-task completion, or before a predetermined time from a time point when the conveyance-task completion is expected. Alternatively, when a certain time is required for a switch of tasks, the task-priority calculation unit 11 may calculate the importance level may be calculated at a timing in consideration of this time. In addition, the importance level may be recalculated with an option of cancelling a conveyance task being performed and of issuing an instruction for another conveyance task in accordance with situation changes such as some failure that has occurred in the factory or a warehouse (such as malfunction of a manufacturing device or the conveying vehicle, and occurrence of an accident in a specific area).

The conveyance-task determination unit 12 determines a conveyance task with a highest importance level as a candidate for a conveyance task to be performed next. The conveyance-task determination unit 12 selects the conveyance task with the highest importance level among importance levels of conveyance tasks as the next conveyance task, each of the importance levels being calculated by the task-priority calculation unit 11. In addition, at this time, the conveyance-task determination unit 12 may determine and store a plurality of ones of the conveyance tasks with higher ones of the importance levels in an order of the importance levels as next and subsequent conveyance tasks. By doing so, a frequency of calculating the importance levels can be reduced. This process by the conveyance-task determination unit 12 can be regarded also as a process of determining, from among the two or more conveyance tasks, conveyance tasks with higher ones of the important levels as candidates to be performed next.

Note that, when each of the importance levels is based on the use rate of the conveyance buffer between the conveyance-origin WS and the conveyance-destination WS, the conveyance-task determination unit 12 may determine a conveyance task corresponding to a conveyance route where the conveyance margin calculated by the task-priority calculation unit 11 is high as the candidate for the next conveyance task. In other words, in this case, the conveyance-task determination unit 12 may determine a conveyance tasks corresponding to a conveyance route where the conveyance-route parameter is small as the candidate for the next conveyance task.

The output unit 13 outputs conveyance task information including information about the conveyance-origin WS and the conveyance-destination WS in the determined conveyance task. In the second example embodiment, it is assumed that the output unit 13 outputs a link identifier in the next conveyance task to the conveyance-task-information receiving device 40 as the conveyance task information. Note that the output unit 13 may output the identifier of the conveyance-origin WS (the movement-destination WS for the conveying device 50) and the identifier of the conveyance-destination WS simultaneously with each other. Alternatively, the output unit 13 may output the identifier of the conveyance-origin WS (the movement-destination WS for the conveying device 50) first, and then output the identifier of the conveyance-destination WS after the conveying device 50 reaches the movement-destination WS (the conveyance-origin WS). In another alternative, the output unit 13 may control the conveyance subject (such as the autonomous conveying vehicle) present at the $WS_x$, i.e., the movement-origin WS for the conveying device 50 such that the conveyance subject performs a task of conveying a product in process from the conveyance-origin $WS_y$ to the conveyance-destination $WS_z$. In this case, the conveyance subject present at the $WS_x$, i.e., the movement-origin WS receives an instruction for the control, and performs the conveyance task from the conveyance-origin $WS_y$ to the conveyance-destination $WS_z$ in accordance with the received control instruction.

The conveyance-task-information receiving device 40 that has received the conveyance task information may display locations of the conveyance-origin WS and the conveyance-destination WS, route guidance, and the like on the display device of the conveyance-task-information receiving device 40. Alternatively, the conveyance-task-information receiving device 40 may deliver the conveyance task information to the worker by voice with use of a voice output device (such as a headphone) mounted to the conveyance-task-information receiving device 40. In another alternative, the conveyance-task-information receiving device 40 may display, for example, a line to be traced, spatial coordinates of a movement-destination point, and a marker to be a mark on the display device of the conveying vehicle (the conveying device 50). Then, the conveying device 50 (such as the conveyance worker or the conveying vehicle) conveys a product in process from the output buffer of the WS represented by the conveyance-origin-WS identifier corresponding to the conveyance task information (the link identifier) to the input buffer of the WS represented by the conveyance-destination-WS identifier corresponding to the link identifier.

With such a configuration of the conveyance-task control device 20, the conveyance-task control device 20 calculates the importance level (the priority) of each of the plurality of conveyance tasks. In this case, the conveyance-task control device 20 calculates the importance level (the priority) on the basis of an at least one or more of the use rate of the output buffer (the conveyance-origin parameter), the use rate of the input buffer (the conveyance-destination parameter), and the use rate of the conveyance buffer (the conveyance-route parameter) in a corresponding one of the conveyance tasks. Then, the conveyance-task control device 20 determines the conveyance task with the highest importance level (the highest priority) as the candidate for the conveyance task to be performed next. By doing so, even in a case where the use rate of each of the buffers varies due to great fluctuation in processing speed in a corresponding one of the WSs or great fluctuation in conveyance-required time among the WSs, the next conveyance task can be determined dynamically in accordance with the use rates of the buffers including products in process being conveyed. Thus, task contents in the cases where the processing speed in each of the WSs or the conveyance-required times among the WSs greatly fluctuate can be more appropriately determined.

In this context, in factories of a multiproduct and variable-quantity-production type and ultra-multiproduct warehouses, new products are produced and stored at high frequency. Further, a workload itself may frequently and greatly fluctuate in accordance with variation in demand. Thus, it is difficult to predict processing speeds (capabilities) on the basis of past performance values.

Still further, there may be steps in which the processing speeds tend to inherently and greatly fluctuate due to causes as listed below.

Unpredictable outages are liable to occur. (For example, when it is inevitable to set manufacturing devices to be stopped frequently in the steps due to a large safety margin for quality assurance, or when the manufacturing devices to be used in the step are poor in availability.)

Tasks depend on abilities of the workers, and their abilities are different from worker to worker. (For example, the abilities vary depending on skill levels of the workers and combinations of the workers in task teams.)

Workers' fatigue (For example, degrees of concentration on the tasks vary depending on eye strain and times elapsed since starts of the tasks.)

Thus, in the cases where the processing speeds greatly fluctuate, the task contents cannot be appropriately determined, and production efficiency may decrease.

In addition, in the factories of the multiproduct and variable-quantity-production type and the ultra-multiproduct warehouses, the amount of products in process to be conveyed, and combinations of the import-destination workstations and the import-origin workstations may greatly fluctuate in accordance with the variation in demand. For this reason, it is difficult to predict a conveyance load in advance and to design layouts of the warehouses and the factories optimally for the conveyance. Thus, jams on a common route where a large number of conveyance tasks are performed and unpredictable delays, for example, at an intersection where the conveyance routes intersect with each other are liable to occur. Therefore, it is difficult to accurately predict the conveyance-required times on the basis of the past performances. As a result, in the cases where the conveyance-required times greatly fluctuate, the task contents cannot be appropriately determined, and the production efficiency may decrease.

Thus, in controlling the conveyance tasks between the above-described workstations, in the case where the processing speed in each of the WSs or the conveyance-required times among the WSs greatly fluctuate, the conveyance tasks between the workstations may not be appropriately controlled. As a countermeasure, the conveyance-task control device 20 according to this example embodiment is configured to calculate the importance level on the basis of the at least one or more of the use rate of the output buffer, the use rate of the input buffer, and the use rate of the conveyance buffer in a corresponding one of the conveyance tasks. Thus, the task contents in the cases where the processing speed in each of the WSs or the conveyance-required times among the WSs greatly fluctuate can be more appropriately determined.

Further, in this example embodiment, when the importance level is based on the use rate of the output buffer of the conveyance-origin WS, the importance level becomes higher as the use rate of the output buffer of the conveyance-origin WS becomes higher. Still further, when the importance level is based on the use rate of the input buffer of the conveyance-destination WS, the importance level becomes higher as the use rate of the input buffer of the conveyance-destination WS becomes lower. Yet further, when the importance level is based on the use rate of the conveyance buffer between the conveyance-origin workstation and the conveyance-destination workstation, the importance level becomes higher as the use rate of the conveyance buffer between the conveyance-origin workstation and the conveyance-destination workstation becomes lower.

Thus, when the importance level is based on the use rate of the output buffer of the conveyance-origin WS, the conveying device 50 may perform a conveyance task from a conveyance-origin WS where the use rate of the output buffer is high. Further, when the importance level is based on the use rate of the input buffer of the conveyance-destination WS, the conveying device 50 may perform a conveyance task to a conveyance-destination WS where the use rate of the input buffer is low. Still further, when the importance level is based on the use rate of the conveyance buffer between the conveyance-origin WS and the conveyance-destination WS, the conveying device 50 may perform a conveyance task via a route where the use rate of the conveyance buffer between the conveyance-origin WS and the conveyance-destination WS is low. In such a way, the conveying device 50 may operate to reduce the spatial bias of the use rates of the buffers including products in process being performed.

In this context, the "spatial bias of the use rates of the buffers including products in process being conveyed" is described. For example, when a large number of products in process are accumulated in the output buffer of a certain WS while the input buffer of a conveyance destination tends to be empty, the worker, a task device, or the like in the conveyance-destination WS spends an unnecessary wait time. Thus, an operating rate decreases, with the result that productivity decreases. In addition, for example, when products in process are conveyed from the output buffer of a certain WS exclusively to a nearby WS to cause the input buffer of this conveyance-destination WS tend to overflow while the products in process are not conveyed so many to another slightly far WS, the input buffer of this slightly far WS tends to be empty. Also in such a case, the worker, the task device, or the like in the slightly far WS spends an unnecessary wait time. Thus, an operating rate decreases, with the result that productivity decreases. In addition, irrespective of a state in which a route between the output buffer of a certain conveyance-origin WS and the input buffer of a certain conveyance-destination WS has been congested, when products in process are conveyed via this congested route, jams occur to increase a conveyance completion time. As a result, productivity decreases. In contrast, the conveyance-task control device 20 according to this example embodiment operates the conveying device 50 to reduce such a spatial bias of the use rates of the buffers including products in process being conveyed. Thus, decrease in productivity in an entirety of a production system can be reduced.

In addition, the conveyance-task control device 20 according to this example embodiment calculates the importance levels by using the moving costs in addition to the use rates of the buffers including products in process being conveyed. By doing so, next conveyance tasks can be determined also in view of the moving costs. If the moving routes of the conveyance subjects (such as the conveying vehicles or the workers) are complicated, the respective moving distances of the conveyance subjects vary from each other, and a large number of intersections may be present on the moving routes. Thus, a moving time to the conveyance-origin workstation dynamically varies due to the jams and the like. As a countermeasure, a route of the conveyance subject to be used in a certain conveyance task may need to be dynamically determined. Thus, when the importance level of a conveyance task in which the use rate of the output buffer of the conveyance-origin workstation is high and the use rate of the input buffer of the conveyance-destination workstation is low is merely increased, the moving time of the conveyance subject to the conveyance-destination workstation may be enormous. For example, it is assumed that, in a certain conveyance task, although the use rate of the output buffer of the conveyance-origin WS is high and the use rate of the input buffer of the conveyance-destination WS is low, the conveyance subject is absent near this conveyance-origin WS. In this case, when only the use rate of the output buffer and the use rate of the input buffer are taken into consideration as in the above-described example, the moving time of the conveyance subject to the conveyance-destination workstation may is enormous. Thus, the time required for the conveyance task increases, and hence a state in which a task at another workstation is not performed (an idling state) may occur. As a result, the productivity of all the plurality of workstations may be degraded.

In contrast, the conveyance-task control device 20 according to this example embodiment is configured to calculate the importance level of each of the plurality of conveyance tasks by using the moving cost that is required for the movement of the conveying device 50 from a current location to the conveyance-origin workstation. By doing so, the moving cost (the moving time) of the conveyance subject to the conveyance-destination workstation can be suppressed from being enormous, and the state in which a task at another workstation is not performed (the idling state) can be suppressed from occurring. Thus, the conveyance tasks between the workstations can be appropriately controlled, and hence the productivity of all the plurality of workstations can be increased.

Next, operation by the conveyance-task control device 20 according to this example embodiment is described.

Figure 10:
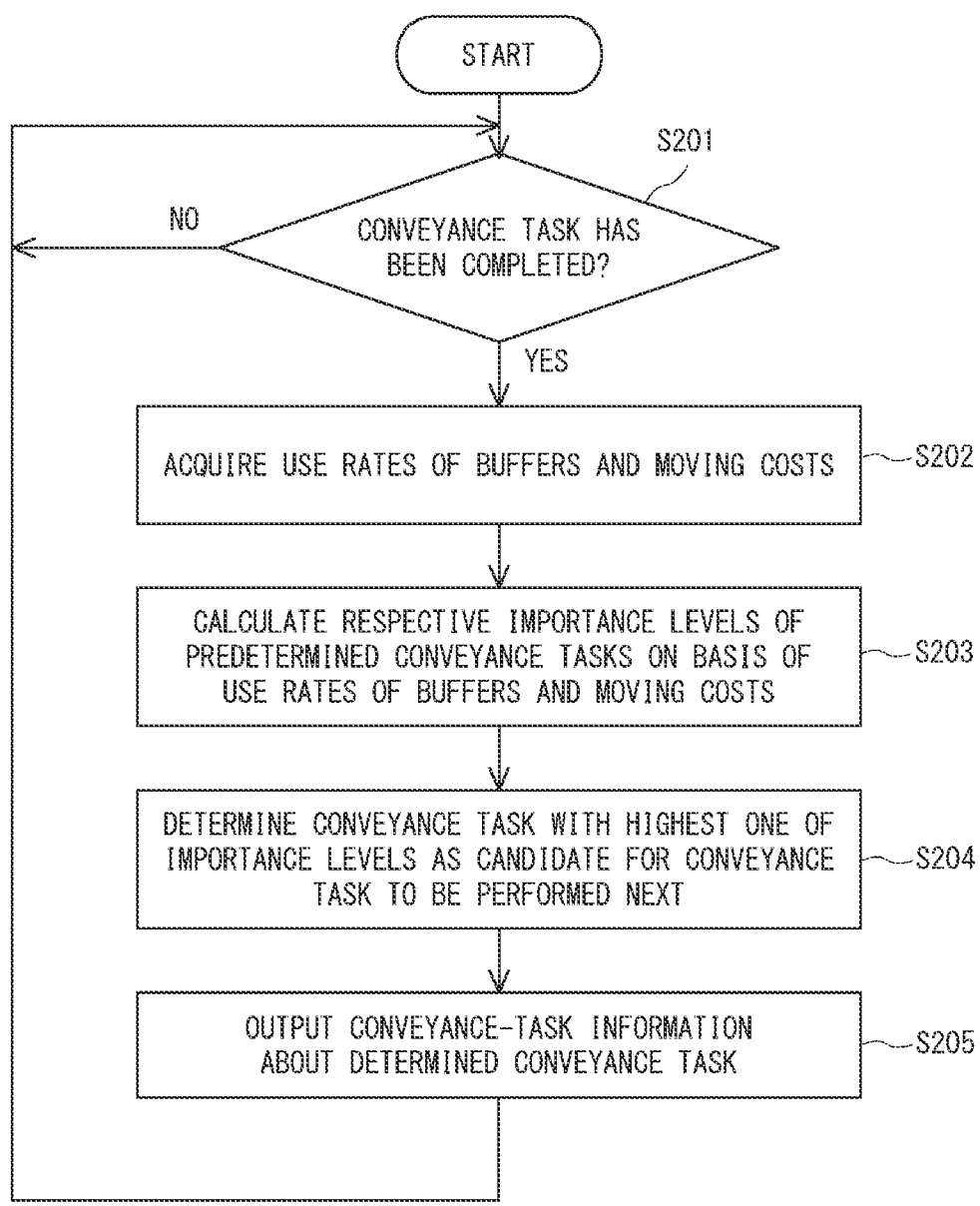
FIG. 10 is a flowchart showing an example of operation by the conveyance-task control device according to the second example embodiment.

FIG. 10 is a flowchart showing an example of the operation by the conveyance-task control device 20 according to the second example embodiment. In the second example embodiment, it is assumed that the conveyance-task control device 20 determines a next conveyance task each time one conveyance task is completed.

First, the task-completion-event detection unit 24 detects completion of a conveyance task (a preceding conveyance task) by the conveying device 50 (YES in Step S201). At this time, the task-priority calculation unit 11 acquires the use rates of the buffers including products in process being conveyed (the conveyance-route parameters, the conveyance-destination parameters, and the conveyance-origin parameters) and the moving costs relating to conveyance tasks for which the importance levels (the priorities) are to be calculated (Step S202).

In Step S202, first, the task-priority calculation unit 11 acquires the conveyance-origin-WS identifiers and the conveyance-destination-WS identifiers corresponding to link identifiers of the conveyance tasks for which the importance levels (the priorities) are to be calculated from the conveyance-destination management table in the conveyance-information storage unit 26. Then, the task-priority calculation unit 11 acquires the use rates of the output buffers of the conveyance-origin WSs (the conveyance-origin parameters) and the use rates of the input buffers of the conveyance-destination WSs (the conveyance-destination parameters) corresponding respectively to the links (the conveyance tasks) from the workstation-buffer-use-rate acquisition unit 25. Note that the workstation-buffer-use-rate acquisition unit 25 has acquired the use rates of the output buffers and the use rates of the input buffers respectively from the WSs at predetermined timings. Further, the task-priority calculation unit 11 acquires the conveyance-buffer buffer use rates (the conveyance-route parameters) between the output buffers of the conveyance-origin WSs and the input buffers of the conveyance-destination WSs corresponding respectively to the links (the conveyance tasks) from the conveyance-buffer-use-rate acquisition unit 27. Note that the conveyance-buffer-use-rate acquisition unit 27 has acquired the respective conveyance-buffer use rates of the links at predetermined timings.

Still further, in Step S202, the task-priority calculation unit 11 acquires the moving costs of links on each of which the movement-origin WSs corresponds to a current location from the moving-cost management table in the conveyance-information storage unit 26. Note that the task-priority calculation unit 11 may acquire the use rates of the buffers including products in process being conveyed (the conveyance-route parameters, the conveyance-destination parameters, and the conveyance-origin parameters) and these moving costs simultaneously with each other, or may perform either acquisition first.

Next, the task-priority calculation unit 11 calculates the respective importance levels (the priorities) of the conveyance tasks for which the importance levels are to be calculated on the basis of the use rates of the buffers including products in process being conveyed and the moving costs, acquired in Step S202 (Step S203). After that, the conveyance-task determination unit 12 determines a conveyance task with a highest one of the importance levels calculated by the task-priority calculation unit 11 as a next conveyance task (Step S204). Then, the output unit 13 outputs the conveyance-task information about the conveyance task determined as a candidate for the next conveyance task by the conveyance-task determination unit 12 (the information about the conveyance-origin WS and the conveyance-destination WS), to the conveyance-task-information receiving device 40 and the like (Step S205).

Next, the example of the operation by the conveyance-task control device 20 according to the second example embodiment is described in more detail. First, it is assumed that a WS network according to the second example embodiment is configured as shown in FIG. 6. Further, it is assumed that the conveyance-information storage unit 26 of the conveyance-task control device 20 stores the conveyance-destination management table shown in FIG. 8 and the moving-cost management table shown in FIG. 9. Still further, it is assumed that importance levels of conveyance tasks relating to the nine links shown in FIG. 8 are to be calculated.

Specifically, a case where the conveying device 50 has completed conveyance to the input buffer of the $WS_{x1}$ and then the conveyance-task control device 20 determines a next conveyance task to be performed by the conveying device 50 is described. First, the task-completion-event detection unit 24 of the conveyance-task control device 20 detects that the conveying device 50 has completed a preceding conveyance task (YES in S201 in FIG. 10). At this time, the task-priority calculation unit 11 acquires the use rates of the buffers including products in process being conveyed and the moving costs (S202). Then, the task-priority calculation unit 11 calculates the importance levels (the priorities) of the conveyance tasks corresponding respectively to the link identifiers shown in FIG. 8 on the basis of the use rates of the buffers including products in process being conveyed and the moving costs (S203).

For example, it is assumed that, when the task-priority calculation unit 11 calculates an importance level $IM_{y1z1}$ of a conveyance task from the $WS_{y1}$ to the $WS_{z1}$, this importance level (priority) is calculated by Equation 1. In this case, the importance level $IM_{y1z1}$ (the priority) is calculated by Equation 3 shown below.

[Math 3]

$$IM_{y1z1} = \frac{O_{y1} - I_{z1} - V_{y1z1}}{C'_{x1y1}} \qquad \text{(Equation 3)}$$

In this equation, "$O_{y1}$" is the use rate of the output buffer (the conveyance-origin parameter) of the $WS_{y1}$ (the conveyance origin). Further, "$I_{z1}$" is the use rate of the input buffer (the conveyance-destination parameter) of the $WS_{z1}$ (the conveyance destination). Still further, "$V_{y1z1}$" is the use rate of the conveyance buffer between the output buffer of the $WS_{y1}$ (the conveyance origin) and the input buffer of the $WS_{z1}$ (the conveyance destination). Yet further, "$C'_{x1y1}$" is the moving cost required for a movement from a current location (the input buffer of the $WS_{x1}$) to the $WS_{y1}$, i.e., the movement destination (the conveyance origin). In other words, "$C'_{x1y1}$" is a moving cost relating to a link corresponding to the moving-cost identifier $C_{x1y1}$.

Note that the task-priority calculation unit 11 is able to acquire the moving costs from the moving-cost management table (FIG. 9) in the conveyance-information storage unit 26. Further, the task-priority calculation unit 11 is able to acquire the input-buffer use rates and the output-buffer use rates of the workstations from the workstation-buffer-use-rate acquisition unit 25. Still further, the task-priority calculation unit 11 is able to acquire the conveyance-buffer use rates from the conveyance-buffer-use-rate acquisition unit 27.

FIG. 11 shows an example of the buffer use rates acquired respectively from the WSs by the workstation-buffer-use-rate acquisition unit 25. "I's" of the buffer identifiers represent the input buffers, and "O's" of the same represent the output buffers. For example, "$I_{x1}$" represents the input buffer of the $WS_{x1}$. Note that, in this example, it is assumed that each of the input-buffer use rates and the output-buffer use rates is the number of accumulated products in process.

FIG. 12 shows an example of the conveyance-buffer use rates relating to the conveyance tasks corresponding to the respective link identifiers acquired by the conveyance-buffer-use-rate acquisition unit 27. Note that, in the example shown in FIG. 12, it is assumed that each of the conveyance-buffer use rates is the total number of products in process being conveyed. In this case, when the task-priority calculation unit 11 calculates the importance level $IM_{y1z1}$ of the conveyance task from the $WS_{y1}$ to the $WS_{z1}$ by Equation 3, the importance level $IM_{y1z1}$ is (100-50-10)/4=10.

FIG. 13 shows an example of results of the calculation of the importance levels by the conveyance-task control device 20 according to the second example embodiment. The task-priority calculation unit 11 calculates the importance levels (the priorities) of conveyance tasks corresponding to links represented by link identifiers x1y1, x1y2, x1y3, x2y1, x2y2, x2y3, y2z1, and y3z1 similar to that of the conveyance task corresponding to the link represented by the link identifier $_{y1z1}$.

Then, the conveyance-task determination unit 12 determines a conveyance task with a highest one of the importance levels (the priorities) as a candidate for a next conveyance task (S204). In the example shown in FIG. 13, a link corresponding to the conveyance task with the highest one of the importance levels is "y1z1." Thus, the conveyance-task determination unit 12 determines the conveyance task corresponding to the link identifier y1z1 as the next conveyance task.

Next, the output unit 13 outputs notification that the conveyance-origin WS of the candidate for the next conveyance task is the $WS_{y1}$ and that the conveyance-destination WS of the same is the $WS_{z1}$ to the conveyance-task-information receiving device 40 (S205). After that, for example, the conveyance worker grasps the conveyance-origin WS and the conveyance-destination WS by checking depiction on the conveyance-task-information receiving device 40, moves the conveying device 50 (the conveying vehicle) to the output buffer of the $WS_{y1}$, and starts the conveyance task from the output buffer of the $WS_{y1}$ to the input buffer of the $WS_{z1}$.

Note that, when the moving costs are the moving distances, a moving cost on the link represented by the link identifier y1z1 is highest, that is, a moving distance (from the $WS_{x1}$ to the $WS_{y1}$) on the same is longest. This is because, as shown in the moving-cost management table in FIG. 9, the conveyance-origin WS (or, the movement destination for the conveying device 50) is the $WS_{y1}$. However, according to the buffer use rates of the workstations in FIG. 11 and the conveyance-buffer use rates in FIG. 12, the link represented by the link identifier y1z1 is large in difference obtained by subtracting the input-buffer use rate of the conveyance-destination WS and the conveyance-buffer use rate from the output-buffer use rate of the conveyance-origin WS. Thus, on the link represented by the link identifier y1z1, there are relatively-large free spaces in the input buffer of the conveyance destination and in the conveyance buffer on the conveyance route relative to the number of accumulated items to be conveyed (the output-buffer use rate). Therefore, the conveyance task corresponding to this link is determined as the next conveyance task.

(Configuration Example of Hardware)

A configuration example of hardware resources that implement the conveyance-task control devices (10 and 20) according respectively to the above-described example embodiments by using a single information-processing device (a computer) is described. Note that each of the conveyance-task control devices may be physically or functionally implemented by using at least two information-processing devices. Alternatively, each of the conveyance-task control devices may be implemented as a dedicated device. In another alternative, only some of functions of each of the conveyance-task control devices may be implemented by using the information processing device.

Figure 14:
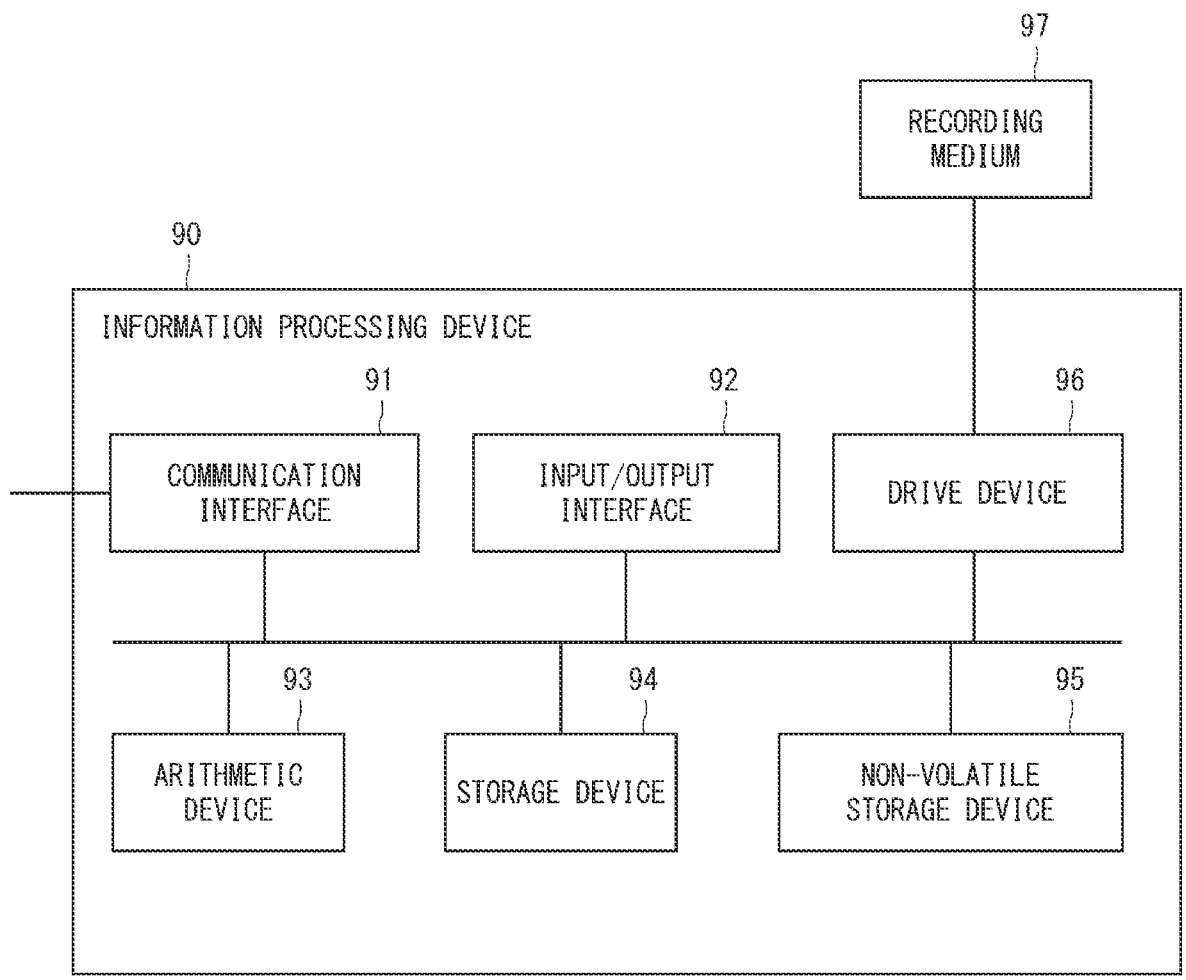
FIG. 14 is a schematic diagram showing a configuration example of hardware of an information processing device that is able to implement the conveyance-task control devices according to the example embodiments.

FIG. 14 is a schematic diagram showing a configuration example of hardware of an information processing device 90 that is able to implement the conveyance-task control devices according to the example embodiments. The information processing device 90 includes a communication interface 91, an input/output interface 92, an arithmetic device 93, a storage device 94, a non-volatile storage device 95, and a drive device 96.

The communication interface 91 is communication means for causing the conveyance-task control devices according to the example embodiments to communicate with an external device in an at least one of a wired manner and a wireless manner. Note that, when each of the conveyance-task control devices is implemented by using the at least two information-processing devices, these two information-processing devices may be connected to each other in a mutually communicable manner via the communication interface 91. The input/output interface 92 is a man-machine interface such as a keyboard, i.e., an example of input devices, or a display as an output device.

The arithmetic device 93 is an arithmetic processing device such as a general-purpose CPU (Central Processing Unit) or a microprocessor. The arithmetic device 93 is able, for example, to read various programs stored in the non-volatile storage device 95 into the storage device 94, and to execute processes in accordance with the read programs.

The storage device 94 is a memory device such as a RAM (Random Access Memory), which can be referred to from the arithmetic device 93, and stores the programs, various data, and the like. The storage device 94 may be a volatile memory device. The non-volatile storage device 95 is a non-volatile storage device such as a ROM (Read Only Memory) or a flash memory, which is able to store the various programs, data, and the like. The drive device 96 is, for example, a device that executes processes of reading and writing data from and into a recording medium 97 described below. The recording medium 97 is any recording medium that is able to record the data, such as an optical disk, a magneto-optical disk, or a semiconductor flash memory.

The example embodiments may be implemented, for example, by configuring the conveyance-task control devices with use of the information processing device 90 exemplified in FIG. 14, and supplying these conveyance-task control devices with the programs that enable these conveyance-task control devices to implement the functions described in the above-described example embodiments. In this case, the arithmetic device 93 may execute the programs supplied to the conveyance-task control devices. By doing so, the example embodiments can be implemented. Further, not all but some of the functions of the conveyance-task control devices can be implemented by the information processing device 90.

Still further, the programs may be recorded in the recording medium 97 in advance, and then appropriately stored into the non-volatile storage device 95 in a shipping phase, an operating phase, or the like of the conveyance-task control devices. Note that, in this configuration, as a method of supplying the programs, a method of installing the programs into the conveyance-task control devices by utilizing a suitable jig in a manufacturing phase before the shipping, the operating phase, or the like may be adopted. Alternatively, as the method of supplying the programs, a general procedure such as a method of externally downloading the programs via a communication line such as the Internet may be adopted.

Modifications

Note that the present invention is not limited to the above-described example embodiments, and modifications may be made as appropriate within the gist of the present invention. For example, one or more of the respective processes of Steps in the above-described flowcharts may be omitted.

In addition, as described above, none of the terms "buffer use rates" only represents the percentage of the use amount relative to the buffer capacity. Each of the terms "buffer use rates" may represent the absolute value of the use amount of the buffer. Alternatively, each of the terms "buffer use rates" may represent the difference between the buffer capacity and the use amount, or may represent the percentage of the use amount relative to the predetermined reference value.

In the above-described examples, the programs are stored by using non-transitory computer-readable media of various types, and can be supplied to the computer. The non-transitory computer-readable media encompass tangible storage media of various types. Examples of the non-transitory computer-readable media include magnetic recording media (such as a flexible disk, a magnetic tape, and a hard disk drive), magneto-optical recording media (such as a magneto-optical disk), a CD-ROM, a CD-R, a CD-R/W, and semiconductor memories (such as a mask ROM, a PROM (Programmable ROM), an EPROM (Erasable PROM), a flash ROM, and a RAM). In addition, the programs may be supplied to the computer via transitory computer-readable media of various types. Examples of these transitory computer-readable media include an electrical signal, an optical signal, and an electromagnetic wave. These transitory computer-readable media are able to supply the programs to the computer via wired communication paths such as an electric wire and optical fiber or a wireless communication path.

Although the invention of the present application is described above with reference to the example embodiments, the invention of the present application is not limited thereto. Various modifications that persons skilled in the art would appreciate may be made to the configurations and the details of the invention of the present application within the scope of the invention.

Some or all of the above-described example embodiments may be described also as, but not limited to, the following supplementary notes.

(Supplementary Note 1)

A conveyance-task control device including:

task-priority calculation means for calculating respective priorities of conveyance tasks on the basis of first parameters respectively indicating a degree of how much amount of products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed; and conveyance-task determination means for determining a conveyance task with a highest one of the respective priorities as a candidate for a conveyance task to be performed next.

(Supplementary Note 2)

The conveyance-task control device according to Supplementary Note 1, in which each of the respective priorities becomes higher as a corresponding one of the first parameters becomes smaller.

(Supplementary Note 3)

The conveyance-task control device according to Supplementary Note 1 or 2, in which the task-priority calculation means calculates the respective priorities on the basis of second parameters respectively indicating how much output buffers of corresponding ones of conveyance-origin workstations are used, on the basis of third parameters respectively indicating how much input buffers of corresponding ones of conveyance-destination workstations are used, and on the basis of the first parameters.

(Supplementary Note 4)

The conveyance-task control device according to Supplementary Note 3, in which the task-priority calculation means calculates each of the respective priorities by using a difference between a difference between a corresponding one of the second parameters and a corresponding one of the third parameters and a corresponding one of the first parameters, or by using a ratio between a difference between a corresponding one of the second parameters and a corresponding one of the third parameters and a corresponding one of the first parameters.

(Supplementary Note 5)

The conveyance-task control device according to any one of Supplementary Notes 1 to 4, in which the task-priority calculation means calculates each of the respective priorities also on the basis of a moving cost that is required for a corresponding one of the plurality of conveyance subjects to move from a current location to a corresponding one of the conveyance-origin workstations.

(Supplementary Note 6)

The conveyance-task control device according to any one of Supplementary Notes 1 to 5, in which each of the first parameters is one or more of an absolute value of a use amount that is a sum of cargoes of ones of the products in process, the ones being conveyed by a group of the plurality of conveyance subjects in a corresponding one of the areas, a percentage of the use amount relative to a conveyance buffer capacity that is a maximum value of the total amount of corresponding ones of the products in process, the corresponding ones being able to be conveyed in the corresponding one of the areas, a difference between the conveyance buffer capacity and the use amount, a percentage of the use amount relative to a predetermined reference value, and a percentage of the amount of the corresponding ones of the products in process relative to the conveyance buffer capacity.

(Supplementary Note 7)

The conveyance-task control device according to any one of Supplementary Notes 1 to 6, in which each of the first parameters is calculated by applying a weight to a use amount of ones of the products in process in accordance with geometrical information about a corresponding one of the conveyance routes.

(Supplementary Note 8)

The conveyance-task control device according to any one of Supplementary Notes 1 to 7, in which each of the first parameters is calculated by applying weights respectively to a plurality of divided areas that are divided from a near area on a corresponding one of the conveyance routes.

(Supplementary Note 9)

The conveyance-task control device according to any one of Supplementary Notes 1 to 8, in which the task-priority calculation means calculates the respective priorities on the basis of only one of the first parameters, the only one relating to a predetermined one of the conveyance routes.

(Supplementary Note 10)

A conveyance-task control system including:

the conveyance-task control device according to any one of Supplementary Notes 1 to 8; and the plurality of workstations.

(Supplementary Note 11)

A conveyance-task control method including:

calculating respective priorities of conveyance tasks on the basis of first parameters respectively indicating a degree of how much amount of products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed; and determining a conveyance task with a highest one of the respective priorities as a candidate for a conveyance task to be performed next.

(Supplementary Note 12)

A non-transitory computer-readable medium storing a program for causing a computer to function as:

task-priority calculation means for calculating respective priorities of conveyance tasks on the basis of first parameters respectively indicating a degree of how much amount of products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed; and conveyance-task determination means for determining a conveyance task with a highest one of the respective priorities as a candidate for a conveyance task to be performed next.

REFERENCE SIGNS LIST

1 CONVEYANCE-TASK CONTROL SYSTEM
10, 20 CONVEYANCE-TASK CONTROL DEVICE
11 TASK-PRIORITY CALCULATION UNIT
12 CONVEYANCE-TASK DETERMINATION UNIT
13 OUTPUT UNIT
24 TASK-COMPLETION-EVENT DETECTION UNIT
25 WORKSTATION-BUFFER-USE-RATE ACQUISITION UNIT
26 CONVEYANCE-INFORMATION STORAGE UNIT
27 CONVEYANCE-BUFFER-USE-RATE ACQUISITION UNIT
40 CONVEYANCE-TASK-INFORMATION RECEIVING DEVICE
50 CONVEYING DEVICE
90 INFORMATION PROCESSING DEVICE
91 COMMUNICATION INTERFACE
92 INPUT/OUTPUT INTERFACE
93 ARITHMETIC DEVICE
94 STORAGE DEVICE
95 NON-VOLATILE STORAGE DEVICE
96 DRIVE DEVICE
97 RECORDING MEDIUM

What is claimed is:

1. A conveyance-task control device comprising:
hardware, including a processor and memory;
task-priority calculation unit implemented at least by the hardware and configured to calculate respective priorities of conveyance tasks on the basis of first parameters respectively indicating a degree of how many products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed; and
conveyance-task determination unit implemented at least by the hardware and configured to determine a conveyance task with a highest one of the respective priorities as a candidate for a conveyance task to be performed next,
wherein at least one of the plurality of conveyance subjects executes the conveyance task with a highest one of the respective priorities by conveying the products in process between the workstations,
wherein each of the first parameters is calculated by applying weights respectively to a plurality of divided areas that are divided from a near area on a corresponding one of the conveyance routes.

2. The conveyance-task control device according to claim 1, wherein each of the respective priorities becomes higher as a corresponding one of the first parameters becomes smaller.

3. The conveyance-task control device according to claim 1, wherein the task-priority calculation unit calculates the respective priorities on the basis of second parameters respectively indicating how much output buffers of corresponding ones of conveyance-origin workstations are used, on the basis of third parameters respectively indicating how much input buffers of corresponding ones of conveyance-destination workstations are used, and on the basis of the first parameters.

4. The conveyance-task control device according to claim 3, wherein the task-priority calculation unit calculates each of the respective priorities by using a value obtained by subtracting the first parameter from a value obtained by subtracting the third parameter from the second parameter.

5. The conveyance-task control device according to claim 1, wherein the task-priority calculation unit calculates each of the respective priorities also on the basis of a moving cost that is required for a corresponding one of the plurality of conveyance subjects to move from a current location to a corresponding one of the conveyance-origin workstations.

6. The conveyance-task control device according to claim 1, wherein each of the first parameters is one or more of an absolute value of a use amount that is a sum of cargoes of ones of the products in process, the ones being conveyed by a group of the plurality of conveyance subjects in a corresponding one of the areas, a percentage of the use amount relative to a conveyance buffer capacity that is a maximum value of the total amount of corresponding ones of the products in process, the corresponding ones being able to be conveyed in the corresponding one of the areas, a difference between the conveyance buffer capacity and the use amount, a percentage of the use amount relative to a predetermined reference value, and a percentage of the amount of the corresponding ones of the products in process relative to the conveyance buffer capacity.

7. The conveyance-task control device according to claim 1, wherein each of the first parameters is calculated by applying a weight to a use amount of ones of the products in process in accordance with geometrical information about a corresponding one of the conveyance routes.

8. The conveyance-task control device according to claim 1, wherein the task-priority calculation unit calculates the respective priorities based on the first parameters of the predetermined conveyance routes.

9. The conveyance-task control device according to claim 1, further comprising: acquisition unit implemented at least by the hardware and configured to acquire first parameters respectively indicating a degree of how much amount of products in process a plurality of conveyance subjects are conveying in corresponding ones of areas respectively including conveyance routes between a plurality of workstations on the basis of at least total number of cargoes of the products in process being conveyed by a group of the conveyance subjects being present in the areas, the plurality of conveyance subjects performing the conveyance tasks of conveying the products in process between the plurality of workstations being sites where predetermined tasks are performed, wherein the task-priority calculation unit calculates respective priorities of conveyance tasks on the basis of at least the first parameters.

10. A conveyance-task control method comprising:

calculating respective priorities of conveyance tasks on the basis of first parameters respectively indicating a degree of how many products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed;

determining a conveyance task with a highest one of the respective priorities as a candidate for a conveyance task to be performed next; and executing by at least one of the plurality of conveyance subjects the conveyance task with a highest one of the respective priorities by conveying the products in process between the workstations, wherein each of the first parameters is calculated by applying weights respectively to a plurality of divided areas that are divided from a near area on a corresponding one of the conveyance routes.

11. A non-transitory computer-readable medium storing a program for causing a computer to function as:

task-priority calculation means for calculating respective priorities of conveyance tasks on the basis of first parameters respectively indicating a degree of how many products in process a plurality of conveyance subjects are conveying in corresponding ones of areas respectively including conveyance routes between a plurality of workstations, the plurality of conveyance subjects performing the conveyance tasks of conveying the products in process between the plurality of workstations being sites where predetermined tasks are performed; and conveyance-task determination means for determining a conveyance task with a highest one of the respective priorities as a candidate for a conveyance task to be performed next, wherein at least one of the plurality of conveyance subjects executes the conveyance task with a highest one of the respective priorities by conveying the products in process between the workstations, wherein each of the first parameters is calculated by applying weights respectively to a plurality of divided areas that are divided from a near area on a corresponding one of the conveyance routes.

* * * * *